(12) United States Patent
Hayashino et al.

(10) Patent No.: US 8,335,179 B2
(45) Date of Patent: Dec. 18, 2012

(54) CONTROL DEVICE, TERMINAL DEVICE, AND COMMUNICATION SYSTEM AND COMMUNICATION METHOD, USING THE SAME

(75) Inventors: Hiroshi Hayashino, Hyogo (JP);
Yoshitaka Ohta, Osaka (JP); Hironori Nakae, Osaka (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 12/677,916

(22) PCT Filed: Jul. 6, 2009

(86) PCT No.: PCT/JP2009/003135
§ 371 (c)(1),
(2), (4) Date: Mar. 12, 2010

(87) PCT Pub. No.: WO2010/007739
PCT Pub. Date: Jan. 21, 2010

(65) Prior Publication Data
US 2010/0232415 A1    Sep. 16, 2010

(30) Foreign Application Priority Data

Jul. 15, 2008    (JP) .................................. 2008-184262

(51) Int. Cl.
*H04B 7/212*    (2006.01)
*H04W 4/00*    (2009.01)
*H04L 12/413*    (2006.01)

(52) U.S. Cl. ........ 370/321; 370/330; 370/338; 370/348; 370/447; 370/461

(58) Field of Classification Search .................. None
See application file for complete search history.

(56) References Cited

U.S. PATENT DOCUMENTS
6,674,738 B1 *    1/2004    Yildiz et al. .................. 370/338
(Continued)

FOREIGN PATENT DOCUMENTS
JP    11-146464    5/1999
(Continued)

OTHER PUBLICATIONS

International Search Report issued Aug. 11, 2009 in corresponding International Application No. PCT/JP2009/003135.

*Primary Examiner* — Andrew Chriss
(74) *Attorney, Agent, or Firm* — Wenderoth, Lind & Ponack, L.L.P.

(57) ABSTRACT

A terminal device, used in communication system conducting communication by periodically switching frequency channels in a predefined sequence, communicates with a control device using a predefined channel. The terminal device includes: an antenna; a reception section receiving, from the control device, via the antenna, data and a beacon containing control information indicating the sequence and its timing; a transmission section transmitting data to the control device via the antenna; a data volume determining section determining whether a transmission can be completed within a predefined period; and a control section controlling, within the period, the reception section to receive the data and the beacon, and the transmission section to transmit the data, and when the data volume determining section determines that the transmission cannot be completed, further controlling the transmission section to, determine a next-to-be-used channel based on the control information, switch to the channel after the period, and continue the transmission.

14 Claims, 21 Drawing Sheets

U.S. PATENT DOCUMENTS

| | | |
|---|---|---|
| 7,002,910 B2 * | 2/2006 | Garcia-Luna-Aceves et al. .................. 370/229 |
| 2003/0012166 A1 * | 1/2003 | Benveniste .................. 370/338 |
| 2004/0114563 A1 * | 6/2004 | Shvodian .................. 370/347 |
| 2005/0036475 A1 | 2/2005 | Nishiyama et al. |
| 2005/0083971 A1 * | 4/2005 | Delaney et al. .............. 370/466 |
| 2006/0089138 A1 * | 4/2006 | Smith et al. ............... 455/426.1 |
| 2006/0140208 A1 * | 6/2006 | Couch et al. .................. 370/445 |

FOREIGN PATENT DOCUMENTS

| | | |
|---|---|---|
| JP | 11-239152 | 8/1999 |
| JP | 2005-20163 | 1/2005 |
| JP | 2008-48365 | 2/2008 |

* cited by examiner

BEACON PERIOD NUMBER

F I G. 1 8
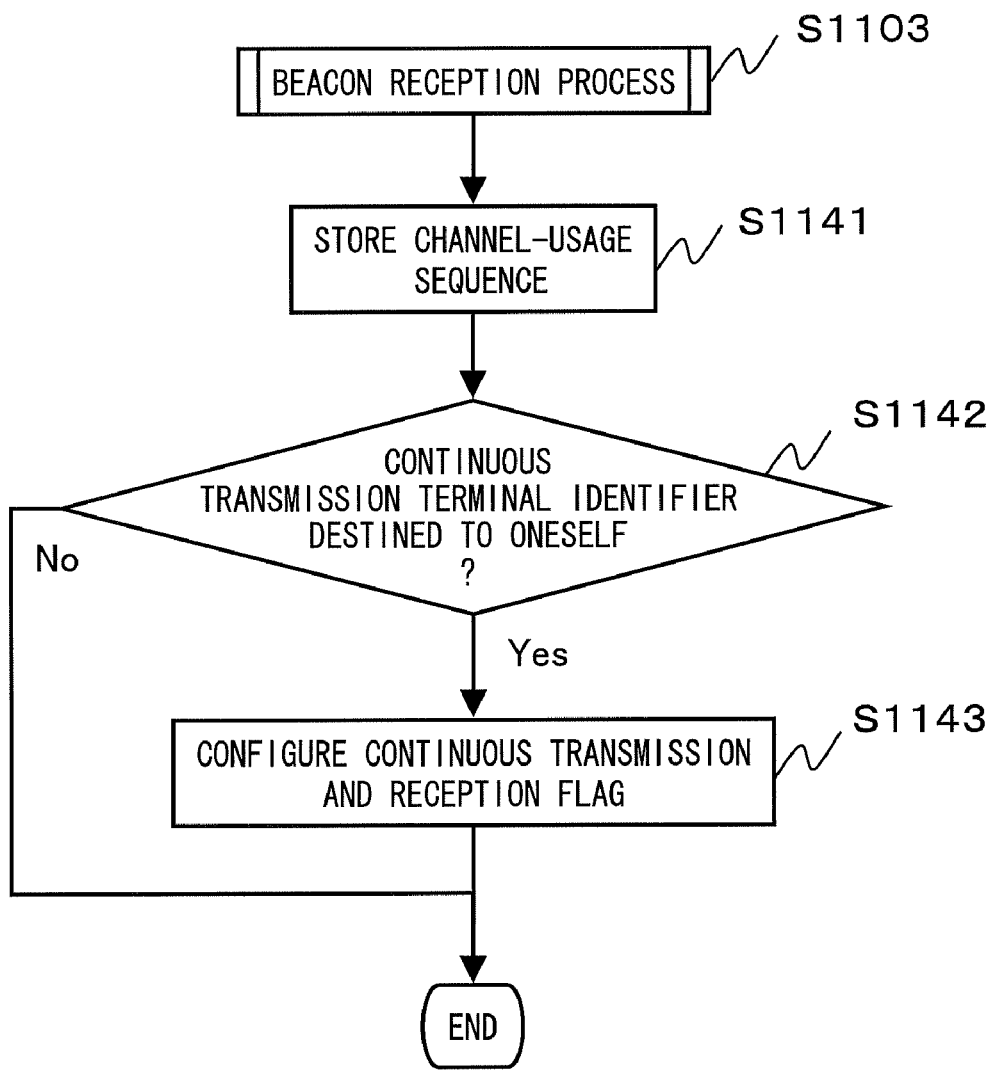

US 8,335,179 B2

CONTROL DEVICE, TERMINAL DEVICE, AND COMMUNICATION SYSTEM AND COMMUNICATION METHOD, USING THE SAME

TECHNICAL FIELD

The present invention relates to a control device, a plurality of wireless communication terminal devices, a communication system that includes these, and a communication method that is used in the communication system. In particular, the present invention relates to a power-saving technology and a transmission efficiency enhancing technology for a sensor network, and a wireless network that includes multiple terminals such an active RF (Radio Frequency) tag and the like.

BACKGROUND ART

In recent years, networks such as WPAN (Wireless Personal Area Network) and a sensor network, which include a wireless communication terminal device that is compact and consumes low power, are attracting attention. One system that is similar to these is a system which includes an active RF tag that actively transmits a wireless signal.

Such a wireless network includes: a control device which is a base station; and terminal devices which are a plurality of wireless communication terminals. The control device incorporates, in a beacon packet, control information for controlling the wireless network, and periodically broadcasts the control information. Based on the control information, terminal devices communicate with the control device. The communication terminals can use various access methods, and for example, CSMA (Carrier Sense Multiple Access), TDMA (Time Division Multiple Access), FDMA (Frequency Division Multiple Access), and SDMA (Space Division Multiple Access) can be used.

Although a terminal device that is used in these wireless networks has a slow transmission speed (from several kbps to several hundred kbps), and a short wireless-signal reaching distance (from several meters to several tens of meters); the terminal device is compact and a battery therein has a low-power-consumption capability that can keep driving the terminal device for several years. Improvements have been implemented in a communication protocol and in a frame format in order to reduce a power consumption of the terminal device; and for example, a wireless network disclosed in patent literature 1 has a configuration that provides an active period for conducting a communication within the wireless network, and a non-active period that allows to enter a sleep mode by not conducting a communication. If a prolonged non-active period can be obtained, a prolonged sleep mode can also be obtained; thus the power consumption can be reduced.

FIG. 24 shows one example of a conventional wireless communication system. The wireless communication system is a wireless network that includes a control device and a terminal device. In the example shown in FIG. 24, a wireless network 400 includes: a control device 401 that controls the wireless network 400; terminal devices 402 to 404, which are wireless communication terminals that conduct wireless communications with the control device 401 by following a control of the control device 401.

FIG. 25 shows a superframe period which is one example of a periodical frame configuration. In FIG. 25, the superframe period includes an active period and a non-active period. The active period is a period for conducting communications between the control device 401 and the terminal devices 402 to 404. The non-active period is a period during which a communication is not conducted, and in this period, each of the terminal devices 402 to 404 can reduce power consumptions by entering a sleep mode.

The control device 401 and the terminal devices 402 to 404, all commonly use the active period. The beginning of the active period is used by the control device 401, and the control device 401 broadcasts a beacon frame. The remainder of the active period is used for communications between the control device 401 and the terminal devices 402 to 404, and, for example, CSMA and the like can be used. Furthermore, the active period can be divided into a plurality of time slots, and the slots can be shared between slot CSMA and TDMA. For example, with IEEE 802.15.4 standard, the first half of the time slots are used for a competitive access by CSMA, and each of the time slots in the second half are assigned to be used by a terminal device to conduct a communication.

The beacon frame includes the control information regarding communication, such as an assignment sequence and the number of these time slots, a length of the active period, a length of the non-active period, a time until a next beacon frame transmission, and the like.

FIG. 26 shows one example of a communication sequence between the control device 401 and the terminal devices 402 to 404. The control device 401 broadcasts a beacon frame 460 at the beginning of an active period 451. The terminal devices 402 to 404 receive the beacon frame 460 and acquire the control information. The control information includes information such as the length of the active period, the length of the non-active period, and the like.

Communications are conducted between the control device 401 and the terminal devices 402 to 404 in the active period 451. For example, a data frame 461 is transmitted from the terminal device 403 to the control device 401, and in response, an ACK (Acknowledgement) frame 462 is transmitted from the control device 401 to the terminal device 403.

The communications between the control device 401 and the terminal devices 402 to 404 are not conducted in a non-active period 452. The control device 401 and the terminal devices 402 to 404 can enter the sleep mode during a time notified in the control information, and can reduce the power consumption. The control device 401 and the terminal devices 402 to 404 return to an operation mode immediately before the end of the non-active period 452, and prepare for the communication in the next active period.

When the non-active period 452 ends, the control device 401 starts the next active period and broadcasts a beacon frame 470. Communications are conducted between the control device 401 and the terminal devices 402 to 404 during an active period 453.

An example shown here is one in which a communication from the terminal device 402 to the control device 401 fails. For example, suppose a case where a data frame 471 is transmitted from the terminal device 402 to the control device 401, but a reception error of this data has been generated at the control device 401. In this case, the control device 401 does not transmit, to the terminal device 402, an ACK frame in response to the data frame 471.

The terminal device 402 will continue waiting for an ACK frame from the control device 401 for a predefined period. When the ACK frame is not returned even after the predefined period has elapsed, the terminal device 402 determines that a transmission of the data frame 471 has failed. Then, the terminal device 402 tries to retransmit the data frame, and transmits a retransmission data frame 472. Here, suppose a case where the retransmitted data frame 472 has been safely received by the control device 401. In this case, the control device 401 transmits, to the terminal device 402, an ACK frame 473 in response to the retransmitted data frame 472.

Subsequently, similar operations are repeated, and communications between the control device 401 and the terminal devices 402 to 404 are conducted.

CITATION LIST

Patent Literature

[PTL 1] Japanese Laid-Open Patent Publication No. 2008-48365

SUMMARY OF INVENTION

Technical Problem

However, in such a wireless network, the plurality of terminal devices that participate in the wireless network operate in accordance with the active period and the non-active period defined by the control device. Data transmission and reception will be completed within a single active period when a data volume that is transmitted and received by each of the terminal devices is small; however, when transmission data volume from any one of the terminal devices is large, the transmission and reception will not be completed within a single active period, and the transmission and reception have to be suspended until the next active period. Therefore, when there is large data to be transmitted and received, a problem arises where a delay becomes larger. This problem can be solved and the communication delay can be reduced by prolonging the active period relative to the non-active period; however, in this case, it is necessary for a wireless communication terminal device which has a small data volume for transmission and reception to also operate during the active period, resulting in an increased power consumption. For example, during ordinary times, the control device only periodically authenticates each of the terminal devices by using a small communication volume; however, for a system that needs to conduct transmission and reception of a large amount of data, such as audio data and the like, without any delays at a time of urgency, it is important to solve this problem.

An objective of the present invention is to provide a control device, a terminal device, and a communication system and a communication method, which use the control device and the terminal device, all of which solve the problem described above by enabling: increase and decrease of a duration of a period during which a terminal device is active, depending on a data volume to be transmitted and received; a completion of a communication of data to be transmitted and received in a shorter period of time; and a power-saving operation in accordance with the data to be transmitted and received.

Solution to Problem

In order to solve the problem of the conventional technology described above, one aspect of the present invention is a terminal device which is used in a communication system that conducts a communication by periodically switching a plurality of frequency channels in a predefined sequence, and which communicates with a control device that uses a predefined frequency channel among the plurality of frequency channels, the terminal device including: an antenna that conducts transmission and reception of a wireless signal; a reception section that receives, from the control device, via the antenna, reception data and a beacon that contains control information indicating at least a switching sequence and a switching timing of the frequency channel; a transmission section that transmits transmission data to the control device via the antenna; a data volume determining section that determines whether or not it is possible to complete a transmission of the transmission data within a period while the predefined frequency channel is in use; and a control section that controls, during the period while the predefined frequency channel is in use, the reception section so as to receive the reception data and the beacon, and the transmission section so as to transmit the transmission data, while the control section further controls, when the data volume determining section determines that it is not possible to complete the transmission, the transmission section so as to, determine a next-to-be-used channel that follows the predefined frequency channel based on the control information, switch to the next-to-be-used channel after the period during which the predefined frequency channel is in use has elapsed, and continue the transmission of the transmission data.

Furthermore, in another aspect of the present invention, the control section described above further controls, when the control information included in the beacon further includes an identifier of the terminal device indicating that a transmission of the reception data from the control device to the terminal device will not be completed within the period while the predefined frequency channel is in use, the reception section so as to, determine the next-to-be-used channel that follows the predefined frequency channel based on the control information, switch to the next-to-be-used channel after the period during which the predefined frequency channel is in use has elapsed, and continue a reception of the reception data.

Furthermore, in another aspect of the present invention, the control section described above determines, when switching to the next-to-be-used channel is not conducted, based on the control information, the switching timing in which the predefined frequency channel is used again, and controls the terminal device so as to wait in a power-saving mode until the switching timing.

Furthermore, another aspect of the present invention is a control device which is used in a communication system that conducts a communication using a plurality of frequency channels, and which periodically switches the plurality of frequency channels in a predefined sequence, and which conducts a communication with one or more terminal devices that are respectively assigned with a predefined frequency channel, the control device including: an antenna that conducts transmission and reception of a wireless signal; a reception section that receives reception data from the terminal devices via the antenna; a beacon generating section that generates a beacon containing control information indicating at least a switching sequence and a switching timing of the frequency channel; a transmission section that transmits the beacon and transmission data to the terminal devices via the antenna; a data volume determining section that determines whether or not it is possible to complete a transmission of the transmission data to each of the terminal devices within a period while a frequency channel assigned to each of the terminal devices is in use; and a control section which controls the beacon generating section so as to periodically switch the frequency channel in the predefined sequence and generate the beacon, and which controls the transmission section so as to transmit, during a period while the frequency channel obtained as a result of switching is in use, the beacon and the transmission data to each of the terminal devices assigned with the frequency channel obtained as a result of the switching, while the control section, when the data volume determining section determines that it is not possible to complete the transmission, further controls, the beacon generating section so as to generate the beacon by further incorporating, in the beacon, an identifier for each of the terminal devices indicating that it is not possible to complete the transmission, and the transmission section so as to continue the transmission of the transmission data after switching to a next-to-be-used channel.

Furthermore, another aspect of the present invention is a communication system that conducts a communication between a control device and one or more terminal devices by periodically switching a plurality of frequency channels in a predefined sequence, while each of the terminal devices includes: a first antenna that conducts transmission and reception of a wireless signal; a first reception section that receives, from the control device, via the first antenna, reception data and a beacon that contains control information indicating at least a switching sequence and a switching timing of the frequency channel; a first transmission section that transmits transmission data to the control device via the first antenna; a first data volume determining section that determines whether or not it is possible to complete a transmission of the transmission data within a period while the predefined frequency channel is in use; and a first control section which controls, during the period while the predefined frequency channel is in use, the first reception section so as to receive the reception data and the beacon, and the transmission section so as to transmit the transmission data, while the first control section further controls: the first transmission section, when the first data volume determining section determines that it is not possible to complete the transmission, so as to, determine a next-to-be-used channel that follows the predefined frequency channel based on the control information, switch to the next-to-be-used channel after the period during which the predefined frequency channel is in use has elapsed, and continue the transmission of the transmission data; and the first reception section, when the control information included in the beacon further includes an identifier of the terminal device indicating that a transmission of the reception data from the control device to the terminal device will not be completed within the period while the predefined frequency channel is in use, so as to, determine the next-to-be-used channel that follows the predefined frequency channel based on the control information, switch to the next-to-be-used channel after the period during which the predefined frequency channel is in use has elapsed, and continue a reception of the reception data, while the control device includes: a second antenna that conducts transmission and reception of a wireless signal; a second reception section that receives reception data from the terminal devices via the second antenna; a beacon generating section that generates a beacon containing control information indicating at least a switching sequence and a switching timing of the frequency channel; a second transmission section that transmits the beacon and the transmission data to the terminal devices via the second antenna; a second data volume determining section that determines whether or not it is possible to complete a transmission of the transmission data to each of the terminal devices within a period while a frequency channel assigned to each of the terminal devices is in use; and a second control section which controls the beacon generating section so as to periodically switch the frequency channel in the predefined sequence and generate the beacon; and which controls the second transmission section so as to transmit, during a period while the frequency channel obtained as a result of switching is in use, the beacon and the transmission data to each of the terminal devices assigned with the frequency channel obtained as a result of the switching, while the second control section further includes a control device that controls, when the second data volume determining section determines that it is not possible to complete the transmission, the beacon generating section so as to generate the beacon by further incorporating, in the beacon, an identifier for each of the terminal device indicating that it is not possible to complete the transmission, and the second transmission section so as to continue the transmission of the transmission data after switching to a next-to-be-used channel.

Furthermore, another aspect of the present invention is an integrated circuit which is used in a communication system that conducts a communication by periodically switching a plurality of frequency channels in a predefined sequence, and which includes a communication function that conducts a communication with a control device that uses a predefined frequency channel among the plurality of frequency channels, the integrated circuit integrates circuits which act as: a reception section that receives, from the control device, via an antenna, reception data and a beacon that contains control information indicating at least a switching sequence and a switching timing of the frequency channel; a transmission section that transmits transmission data to the control device via the antenna; a data volume determining section that determines whether or not it is possible to complete a transmission of the transmission data within a period while the predefined frequency channel is in use; and a control section that controls, during the period while the predefined frequency channel is in use, the reception section so as to receive the reception data and the beacon, and the transmission section so as to transmit the transmission data, while the control section further controls: the transmission section, when the data volume determining section determines that it is not possible to complete the transmission, so as to, determine a next-to-be-used channel that follows the predefined frequency channel based on the control information, switch to the next-to-be-used channel after the period during which the predefined frequency channel is in use has elapsed, and continue the transmission of the transmission data; and the reception section, when the control information included in the beacon further includes an identifier of the terminal device indicating that a transmission of the reception data from the control device to the terminal device will not be completed within the period while the predefined frequency channel is in use, so as to, determine the next-to-be-used channel that follows the predefined frequency channel based on the control information, switch to the next-to-be-used channel after the period during which the predefined frequency channel is in use has elapsed, and continue a reception of the reception data.

Furthermore, another aspect of the present invention is an integrated circuit which is used in a communication system that conducts a communication using a plurality of frequency channels, and which periodically switches the plurality of frequency channels in a predefined sequence, and which includes a communication function that conducts a communication with one or more terminal devices that are respectively assigned with a predefined frequency channel, the integrated circuit integrates circuits which act as: a reception section that receives reception data from the terminal devices via an antenna; a beacon generating section that generates a beacon containing control information indicating at least a switching sequence and a switching timing of the frequency channel; a transmission section that transmits the beacon and transmission data to the terminal devices via the antenna; a data volume determining section that determines whether or not it is possible to complete a transmission of the transmission data to each of the terminal devices within a period while a frequency channel assigned to each of the terminal devices is in use; and a control section which controls the beacon generating section so as to periodically switch the frequency channel in the predefined sequence and generate the beacon, and which controls the transmission section so as to transmit, during a period while the frequency channel obtained as a result of switching is in use, the beacon and the transmission data to each of the terminal devices assigned with the frequency channel obtained as a result of the switching, while the control section, when the data volume determining section determines that it is not possible to complete the transmission, further controls the beacon generating section so as to generate the beacon by further incorporating, in the beacon, an identifier for each of the terminal devices indicating that it is not possible to complete the transmission, and the transmission section so as to continue the transmission of the transmission data after switching to a next-to-be-used channel.

Furthermore, another aspect of the present invention is a communication method which is used in a communication system that conducts a communication by periodically switching a plurality of frequency channels in a predefined sequence, and which conducts a communication with a control device that uses a predefined frequency channel among the plurality of frequency channels, the communication method including the steps of: receiving, from the control device, via an antenna, reception data and a beacon that contains control information indicating at least a switching sequence and a switching timing of the frequency channel; transmitting transmission data to the control device via the antenna; determining whether or not it is possible to complete a transmission of the transmission data within a period while the predefined frequency channel is in use; and controlling, during the period while the predefined frequency channel is in use, an execution of the step of receiving so as to receive the reception data and the beacon, and an execution of the step of transmitting so as to transmit the transmission data, while the step of controlling further includes execution of steps including: determining, when determined that it is not possible to complete the transmission, a next-to-be-used channel that follows the predefined frequency channel based on the control information, switching to the next-to-be-used channel after the period during which the predefined frequency channel is in use has elapsed, and continuing the transmission of the transmission data; and determining, when the control information included in the beacon further includes an identifier of the terminal device indicating that a transmission of the reception data from the control device to the terminal device will not be completed within the period while the predefined frequency channel is in use, the next-to-be-used channel that follows the predefined frequency channel based on the control information, switching to the next-to-be-used channel after the period during which the predefined frequency channel is in use has elapsed, and continuing a reception of the reception data.

Furthermore, another aspect of the present invention is a communication method which is used in a communication system that conducts a communication using a plurality of frequency channels, and which periodically switches the plurality of frequency channels in a predefined sequence, and which conducts a communication with one or more terminal devices that are respectively assigned with a predefined frequency channel, the communication method including steps of: receiving reception data from the terminal devices via an antenna; generating a beacon containing control information indicating at least a switching sequence and a switching timing of the frequency channel; transmitting the beacon and transmission data to the terminal devices via the antenna; determining whether or not it is possible to complete a transmission of the transmission data to each of the terminal devices within a period while a frequency channel assigned to each of the terminal devices is in use; and controlling, an execution of the step of generating so as to periodically switch the frequency channel in the predefined sequence and generate the beacon, and an execution of the step of transmitting so as to transmit, during a period while the frequency channel obtained as a result of switching is in use, the beacon and the transmission data to each of the terminal devices assigned with the frequency channel obtained as a result of the switching, while the step of controlling further includes, when it is determine that it is not possible to complete the transmission at the step of determining, execution of steps including: generating the beacon by further incorporating, in the beacon, an identifier for each of the terminal devices; and continuing the transmission of the transmission data after switching to a next-to-be-used channel.

Furthermore, another aspect of the present invention is a communication program used by a terminal device which is used in a communication system that conducts a communication by periodically switching a plurality of frequency channels in a predefined sequence and which communicates with a control device that uses a predefined frequency channel among the plurality of frequency channels, the communication program causing the terminal device to execute the steps of: receiving, from the control device, via an antenna, reception data and a beacon that contains control information indicating at least a switching sequence and a switching timing of the frequency channel; transmitting transmission data to the control device via the antenna; determining whether or not it is possible to complete a transmission of the transmission data within a period while the predefined frequency channel is in use; and controlling, during the period while the predefined frequency channel is in use, an execution of the step of receiving so as to receive the reception data and the beacon, and an execution of the step of transmitting so as to transmit the transmission data, while the controlling further includes execution of steps including: determining, when determined that it is not possible to complete the transmission, a next-to-be-used channel that follows the predefined frequency channel based on the control information, switching to the next-to-be-used channel after the period during which the predefined frequency channel is in use has elapsed, and continuing the transmission of the transmission data; and determining, when the control information included in the beacon further includes an identifier of the terminal device indicating that a transmission of the reception data from the control device to the terminal device will not be completed within the period while the predefined frequency channel is in use, the next-to-be-used channel that follows the predefined frequency channel based on the control information, switching to the next-to-be-used channel after the period during which the predefined frequency channel is in use has elapsed, and continuing a reception of the reception data.

Furthermore, another aspect of the present invention is a communication program used by a control device which is used in a communication system that conducts a communication using a plurality of frequency channels, and which periodically switches the plurality of frequency channels in a predefined sequence, and which conducts a communication with one or more terminal devices that are respectively assigned with a predefined frequency channel, the communication program causing the control device to execute the steps of: receiving reception data from the terminal devices via an antenna; generating, a beacon containing control information indicating at least a switching sequence and a switching timing of the frequency channel; transmitting the beacon and transmission data to the terminal devices via the antenna; determining whether or not it is possible to complete a transmission of the transmission data to each of the terminal devices within a period while a frequency channel assigned to each of the terminal devices is in use; and transmitting the beacon and transmission data to the terminal devices via the antenna; determining whether or not it is possible to complete a transmission of the transmission data to each of the terminal devices within a period while a frequency channel assigned to each of the terminal devices is in use; and controlling, an execution of the step of generating so as to periodically switch the frequency channel in the predefined sequence and generate the beacon, and an execution of the step of transmitting so as to transmit, during a period while the frequency channel obtained as a result of switching is in use, the beacon and the transmission data to each of the terminal devices assigned with the frequency channel obtained as a result of the switching, while the step of controlling further includes, when it is determine that it is not possible to complete the transmission at the step of determining, execution of steps including: generating the beacon by further incorporating, in the beacon, an identifier for each of the terminal devices indicating that it is not possible to complete the transmission; and continuing the transmission of the transmission data after switching to a next-to-be-used channel.

Advantageous Effects of Invention

According to the present invention, provided are a communication system, and a communication device and a communication method, which are used in the communication system; and all of which enable, by changing a duration of a period during which a terminal is active, depending on a data volume to be transmitted and received, a completion of a communication of data to be transmitted and received in a shorter period of time, and a power-saving operation in accordance with the data to be transmitted and received.

BRIEF DESCRIPTION OF DRAWINGS

FIG. 18 is a flowchart showing a beacon reception process of the terminal device according to embodiment 1 of the present invention.

DESCRIPTION OF EMBODIMENTS

An embodiment of the present invention will be described in the following with reference to figures.

Figure 1:
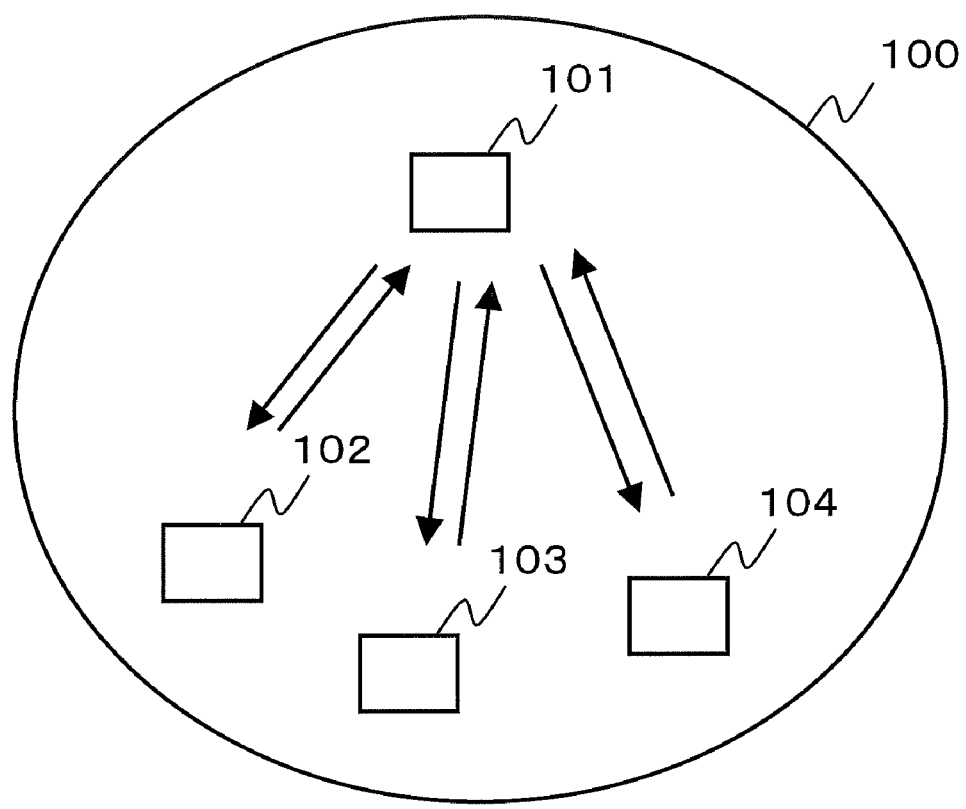
FIG. 1 is a configuration figure of a communication system that includes a control device and a terminal device according to embodiment 1 of the present invention.

FIG. 1 is a figure showing one example of a wireless communication system according to an embodiment of the present invention. The wireless communication system is a network that includes a control device and a terminal device. In the example shown in FIG. 1, a wireless network 100 includes: a control device 101 which is a base station that controls the wireless network 100; terminal devices 102 to 104 which are wireless communication terminals that conduct wireless communication with the control device 101, following a control by the control device 101. Although the number of terminal devices is three in the current example, other numbers may also be applied.

Figure 2:
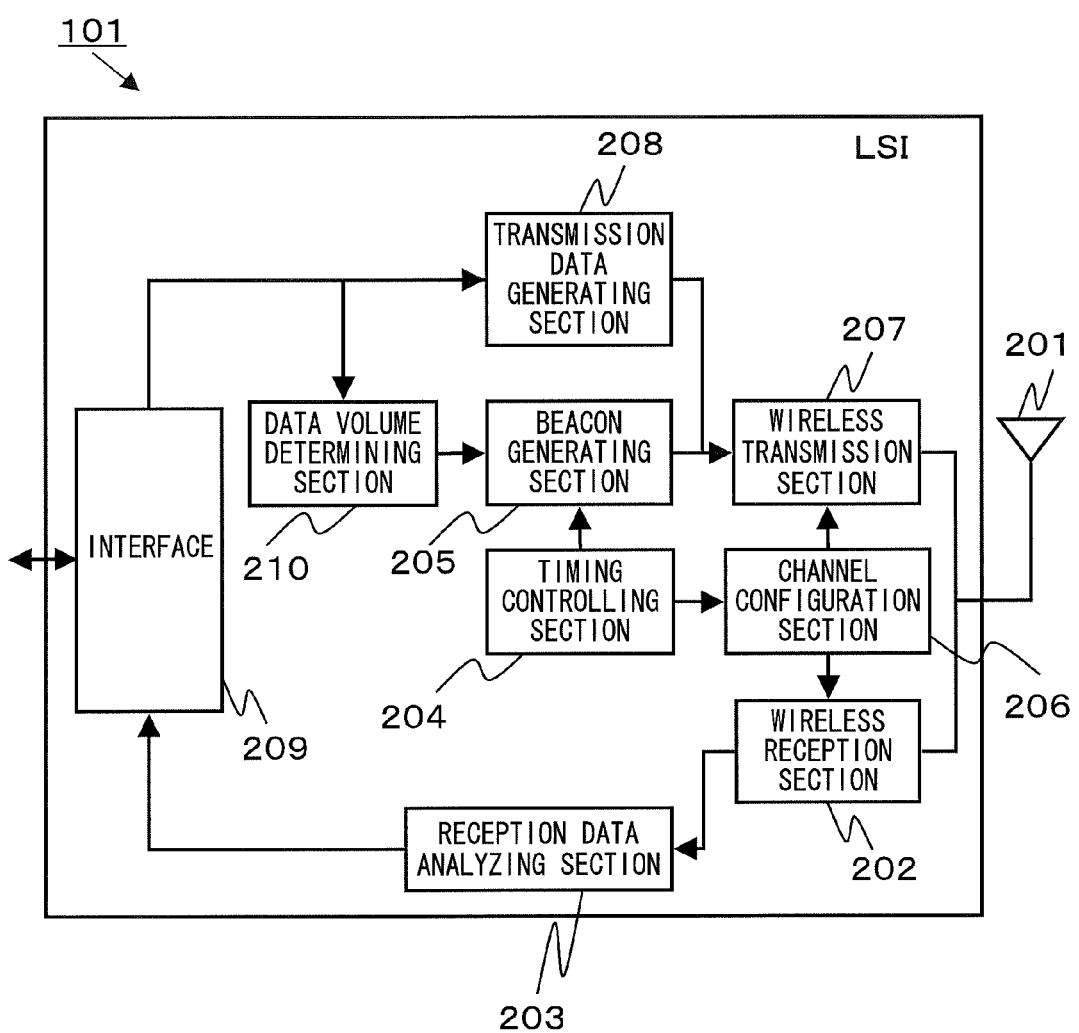
FIG. 2 is a block diagram showing a configuration of the control device according to embodiment 1 of the present invention.

FIG. 2 is a block diagram showing one example of a device configuration of the control device 101 according to embodiment 1 of the present invention. The control device 101 includes: an antenna 201; a wireless reception section 202; a reception data analyzing section 203; a timing controlling section 204; a beacon generating section 205; a channel configuration section 206; a wireless transmission section 207; a transmission data generating section 208; an interface 209 and a data volume determining section 210. A wireless signal received by the antenna 201 is inputted into the wireless reception section 202. The wireless reception section 202 conducts a demodulation process against the wireless signal, and outputs the resulting signal as a reception frame. The reception data analyzing section 203 analyzes the reception frame, and extracts and outputs reception data. The interface 209 outputs the reception data to another instrument and a user. In addition, the interface 209 accepts an input of transmission data from the other instrument and the user. The transmission data generating section 208 generates a transmission data frame based on the transmission data. Furthermore, the data volume determining section 210 observes data of the transmission data inputted from the interface 209, and determines a data volume thereof. Additionally, the timing controlling section 204 controls a transmission timing of a beacon frame that is transmitted periodically. The beacon generating section 205 retrieves control information stored in a memory (not shown), and quality information of each frequency channel (e.g. a transmission error rate of data frame in a communication, and the like), and generates the beacon frame. The channel configuration section 206 configures a frequency channel that conducts wireless transmission and reception. The wireless transmission section 207 generates the wireless signal by modulating the beacon frame, the transmission data frame, and the like; and conducts a wireless transmission via the antenna 201.

Figure 3:
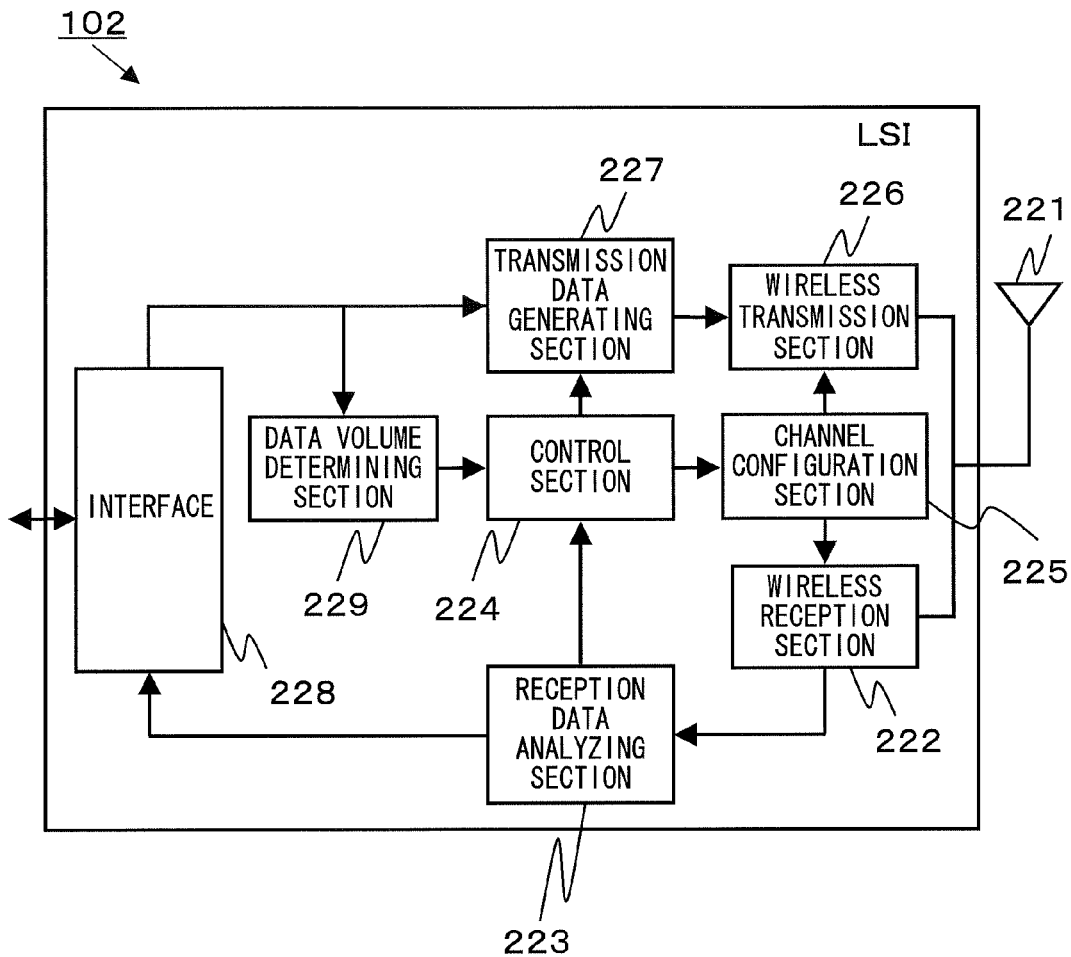
FIG. 3 is a block diagram showing a configuration of the terminal device according to embodiment 1 of the present invention.

FIG. 3 is a block diagram showing one example of a device configuration of the terminal device 102 according to embodiment 1 of the present invention. The other terminal devices 103 and 104 have a similar device configuration. The terminal device 102 includes: an antenna 221; wireless reception section 222; a reception data analyzing section 223; a control section 224; a channel configuration section 225; a wireless transmission section 226; a transmission data generating section 227; an interface 228; and a data volume determining section 229 that determines a data volume. A wireless signal received by the antenna 221 is inputted into the wireless reception section 222. The wireless reception section conducts a demodulation process against the wireless signal, and outputs the resulting signal as a reception frame. The reception data analyzing section 223 analyzes the reception frame, and outputs the reception data. The interface 228 outputs the reception data to another instrument and a user. In addition, the interface 228 accepts an input of transmission data from the other instrument and the user. The transmission data generating section 227 generates a data frame based on the transmission data. Furthermore, based on, control information stored in a memory (not shown), control information included in the beacon frame received from the control device, and quality information of a frequency channel; the control section 224 controls a transmission timing, and selects a frequency channel. The channel configuration section 225 configures a frequency channel that is selected. Furthermore, the data volume determining section 229 observes data of the transmission data inputted from the interface 228, and determines a data volume thereof. The wireless transmission section 226 generates the wireless signal by modulating the transmission data frame and the like; and conducts a wireless transmission via the antenna 221.

Figure 4:
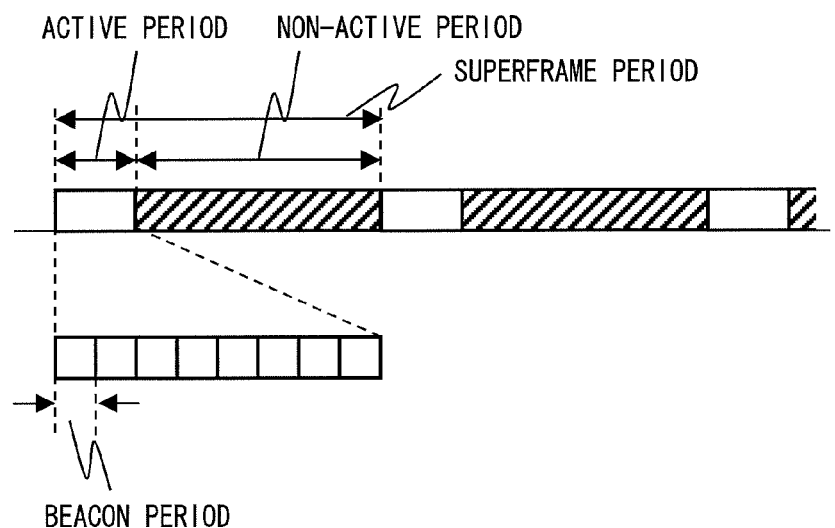
FIG. 4 is a schematic diagram showing a configuration of a superframe according to embodiment 1 of the present invention.

The control device 101 periodically transmits a beacon that contains the control information which is for controlling the wireless network 100. FIG. 4 is a schematic diagram that represents, in a chronological order, one example of a cycle during which the beacon is transmitted. The longest cycle is a superframe period; and the superframe period includes an active period during which the wireless communication is conducted, and a non-active period during which the wireless communication is not conduct. Since, during the non-active period, the control device 101 and the terminal devices 102 to 104 do not conduct the wireless communication and enter a sleep mode, and a process for terminating a supply of power to a functional block that is necessary for the wireless communication, and the like are conducted; a power consumption of the functional block that is necessary for the wireless communication can be suppressed to a minimum. The active period is further divided into a plurality of beacon periods, which are cycle units during which the control device 101 transmits the beacon. In the example shown in FIG. 4, the active period includes eight beacon periods.

Figure 5:
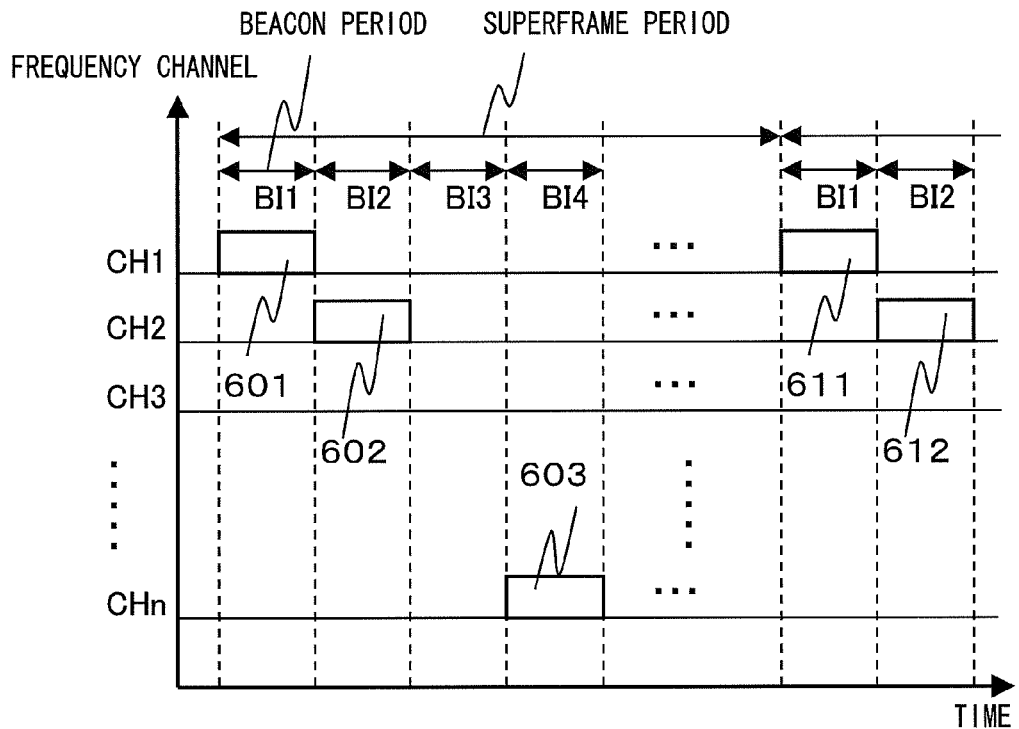
FIG. 5 is a schematic diagram showing an arrangement of a beacon period and a frequency channel according to embodiment 1 of the present invention.

The control device 101 and the terminal devices 102 to 104 conduct communication while switching the frequency channel in each of the beacon periods. FIG. 5 shows a schematic diagram representing an example of a switching of a channel for each of the beacon periods in a case where the communication is conducted by switching the frequency channel in each of the beacon periods.

In FIG. 5, the control device 101 assigns a frequency channel CH1 and arranges a wireless communication period 601, to a period of a beacon period BI1 in the superframe period. Similarly, to a period of a beacon period BI2, a frequency channel CH2 is assigned and a wireless communication period 602 is arranged; and to a period of a beacon period BI4, a frequency channel CHn is assigned and a wireless communication period 603 is arranged. When a superframe period ends and a next superframe period starts, once again, to the period of the beacon period BI1, the frequency channel CH1 is assigned and a wireless communication period 611 is arranged; and to the period of the beacon period BI2, the frequency channel CH2 is assigned and a wireless communication period 612 is arranged. Subsequently, the same frequency channel assignment is repeated for every superframe period.

Figure 6:
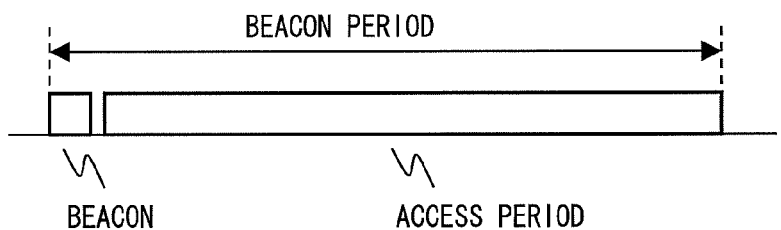
FIG. 6 is a schematic diagram showing an arrangement of the beacon period according to embodiment 1 of the present invention.

FIG. 6 is a schematic diagram representing one example of a configuration of the beacon period. In FIG. 6, in the beacon period, the control device 101 first transmits the beacon that contains the control information of the wireless network 100, and then provides an access period. During this access period, the control device 101 and the terminal devices 102 to 104 can conduct the wireless communication. In the present embodiment, each of the terminal devices 102 to 104 conducts an access control by CSMA (Carrier Sense Multiple Access) and conducts the wireless communication within this access period. A wireless access method is not limited to CSMA, and other wireless access methods such as ALOHA, TDMA, and the like can also be used.

Each of the terminal devices 102 to 104 is assigned with a frequency channel in order to conduct a routine communication. For example, in FIG. 5, when the terminal device 102 communicates in the frequency channel CH1, the terminal device 102 is activated only in the beacon period BD. Therefore, next after the wireless communication period 401, the terminal device 102 conducts communication by CSMA in the access period during the wireless communication period 411. The terminal device 102 does not conduct a wireless communication during a period between the wireless communication period 401 and the wireless communication period 411. Similar to the non-active period, in this period during which a wireless communication is not conducted, a power consumption of the functional block necessary for the wireless communication can be suppressed to a minimum.

In FIG. 4, all the periods, during which the control device 101 in the wireless network 100 is conducting a communication, are described as active periods; however, for example, if attention is focused on the frequency channel CH1, the wireless communication periods 401 and 411 are active periods, whereas the wireless communication periods 402, 403, 412, and other wireless communication periods, during which channels other than CH1 are in use, can be viewed as non-active periods. In this case, the active period of the frequency channel CH2 can be viewed as being configured in the non-active period of the frequency channel CH1.

Figure 7:
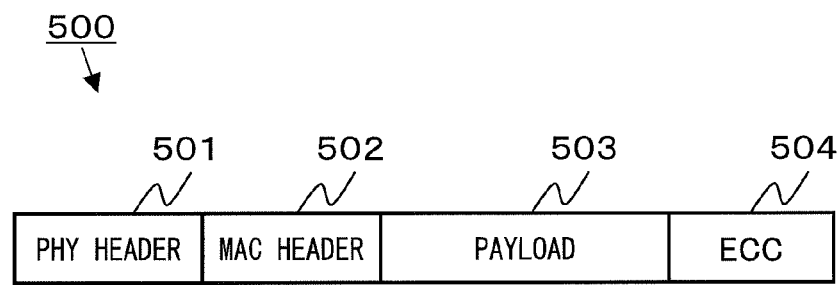
FIG. 7 is a schematic diagram showing a wireless frame format according to embodiment 1 of the present invention.
Figure 8:
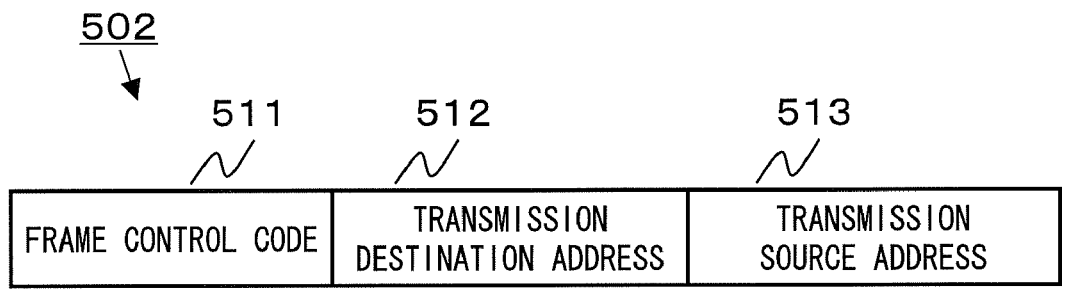
FIG. 8 is a schematic diagram showing a MAC header format according to embodiment 1 of the present invention.

FIG. 7 is a figure showing a format of a wireless frame in which the control device 101 and the terminal devices 102 to 104 conduct transmission and reception during the access period. A wireless frame 500 includes: a PHY (PHYsical layer) header 501 including codes necessary for demodulating the wireless signal, such as a bit synchronization code, a frame synchronization code, and the like; a MAC (Media Access Control) header 502 including a frame type and address information; a payload 503 which is information that is transmitted to a communication partner; and an ECC (Error Correcting Code) 504 for detecting whether or not the wireless frame 500 is safely transmitted. In addition, as shown in FIG. 8, the MAC header 502 includes: a frame control code 511 that indicates a type of the wireless frame 500; a transmission destination address 512 that indicates the terminal device of a transmission destination; and a transmission source address 513 indicating the terminal device of a transmission source. Types of the wireless frame 500 include: a data frame for conducting transmission and reception of data; an ACK frame which is a response provided when data frame and the like are received safely; and the beacon frame for transmitting the control information from the control device 101 to the terminal devices 102 to 104.

A method for conducting a wireless communication in the wireless network 100 between the control device 101 and the terminal devices 102 to 104 will be described in the following.

Figure 9:
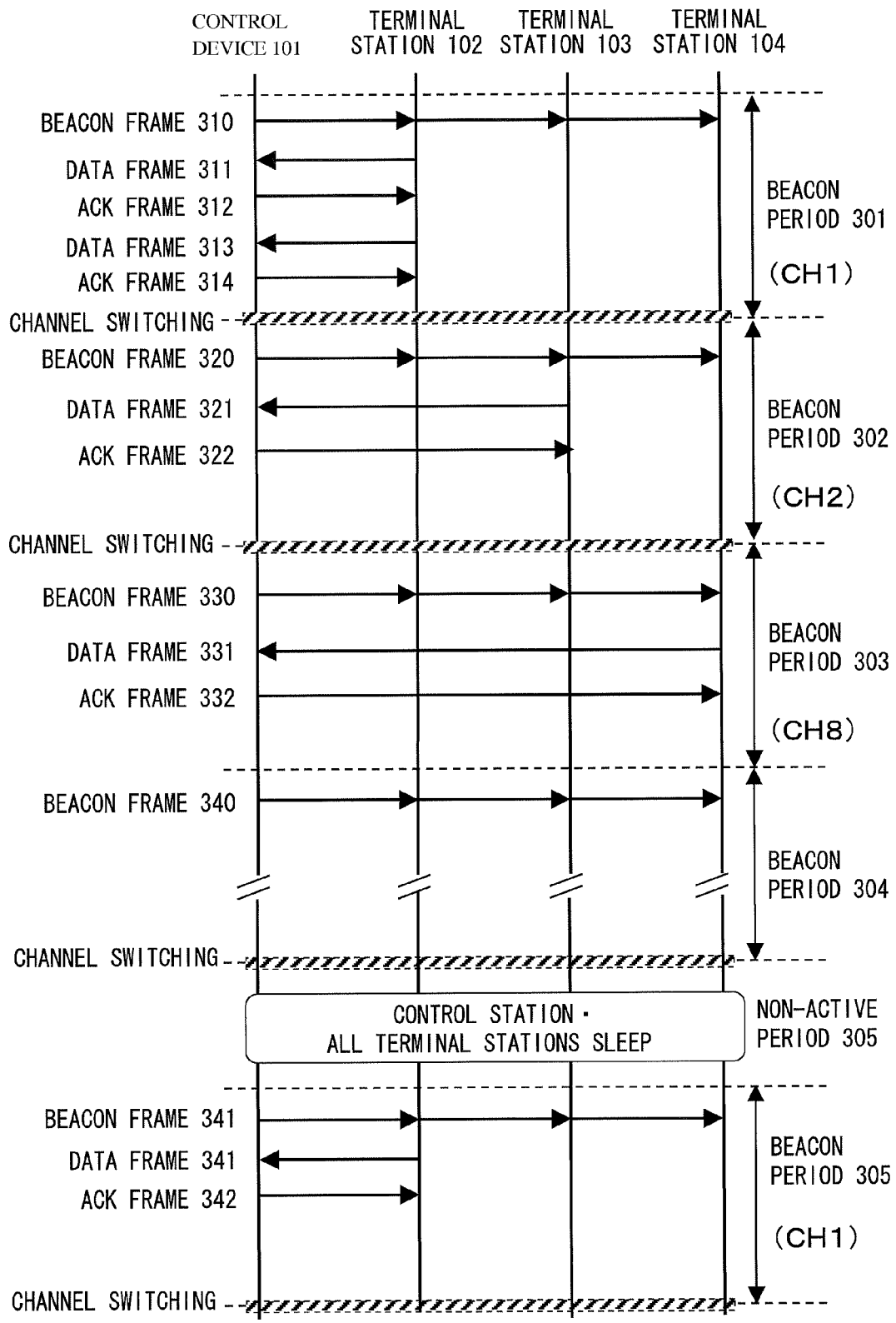
FIG. 9 is a sequence diagram showing one example of a communication sequence according to embodiment 1 of the present invention.

FIG. 9 is a figure showing a sequence of communications between the control device 101 and the terminal devices 102 to 104. In FIG. 9, when the active period begins, first, the control device 101 delivers a beacon frame 310 to the terminal devices 102 to 104 in the wireless network 100. A code that indicates a frame type is provided to the frame control code 511 in FIG. 7; and when the frame type is a beacon, a payload 520 of the beacon frame, which is shown in FIG. 11, is inserted into the payload 503.

Figure 11:
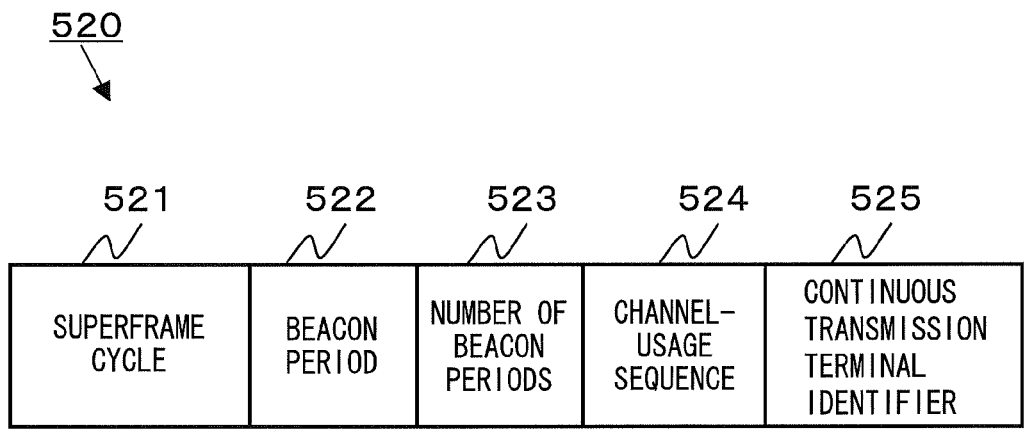
FIG. 11 is a schematic diagram showing a payload of a beacon frame according to embodiment 1 of the present invention.

FIG. 11 shows a format of the payload 520 of the beacon frame. The payload 520 of the beacon frame includes: a superframe cycle 521; a beacon period 522; a beacon period number 523; a channel-usage sequence 524; a continuous transmission terminal identifier 525. The superframe cycle 521 and the beacon period 522 are information indicating each length of the superframe cycle and beacon period shown in FIG. 4 and FIG. 5. In addition, the active period shown in FIG. 4 and FIG. 5 can be calculated by multiplying the beacon period 522 to the beacon period number 523; and the non-active period can be calculated by subtracting the active period from the superframe cycle 521.

As described above, as a result of the control device 101, containing: the superframe cycle 521, which is information indicating a start time of a wireless communication period that is used next by the same frequency channel; and information of the beacon period 522 and the channel-usage sequence 524, which are information respectively indicating a start time and a wireless communication period of another frequency channel, in the payload 520 of the beacon frame, and transmitting the beacon frame, the terminal devices 102 to 104 that received the beacon frame can obtain the information of the timing and usage channel of each wireless communication period, and can select, from a plurality of wireless communication periods, a period for conducting the next communication.

Figure 12:
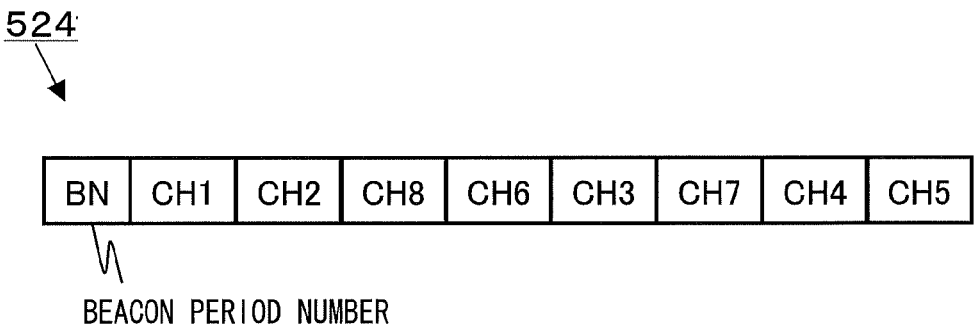
FIG. 12 is a schematic diagram showing a channel-usage sequence in the payload of the beacon frame according to embodiment 1 of the present invention.

FIG. 12 is a figure showing one example of a configuration of the channel-usage sequence 524. In FIG. 12, a beacon period number BN is arranged at the beginning of the channel-usage sequence, and, following the beacon period number BN, frequency channels that are used in each of the beacon periods are sequentially arranged. In the example shown in FIG. 12, the number of beacon periods is eight, and the frequency channels are used in a sequence of CH1, CH2, CH8, CH6, CH3, CH7, CH4, and CH5. Here, when the beacon period number BN is 1, this indicates that the frequency channel in use in the current beacon period is CH1, and it can be understood that the frequency channel which will be used in the next beacon period is CH2, and the frequency channel which will be used in the beacon period immediately after the next beacon period is CH8. Similarly, when the beacon period number BN is 2, the frequency channel in use in the current beacon period is CH2, and it can be understood that the frequency channel which will be used in the next beacon period is CH8, and the frequency channel which will be used in the beacon period immediately after the next beacon period is CH6. The continuous transmission terminal identifier 525 will be described later.

The control device 101 includes a memory (not shown in FIG. 2), and holds information regarding availability of the frequency channel, together with the superframe cycle, the beacon period, and the number of beacon periods, which are control information of the wireless network 100. The information regarding availability of the frequency channel is created by determining whether or not the frequency channel is available by measuring received powers from all frequency channels at a time point when the control device 101 establishes the wireless network 100. Additionally, the control device 101: judges the availability of the frequency channel based on information such as a communication condition with a terminal device in a channel obtained as a result of switching in each of the beacon periods, and a duration time of a reception incapable condition due to a carrier sense; and updates the information regarding availability of the frequency channel at anytime. The control device 101: selects, based on the information regarding availability of the frequency channel, available frequency channels depending on the number of beacon periods; randomly selects a frequency channel from the available frequency channels; determines the channel-usage sequence; and holds the channel-usage sequence in the memory. The control device 101: retrieves, from the memory, the superframe cycle, the beacon period, the number of beacon periods, and the channel-usage sequence; and creates the beacon frame in a format of the payload shown in FIG. 11. In the example shown in FIG. 9, the beacon period number in the channel-usage sequence within the beacon frame 310 that is transmitted at the beginning by the control device 101 is 1. The created beacon frame is modulated by the wireless transmission section 207 shown in FIG. 2, and is transmitted via the antenna 201.

Described in the following with reference to FIG. 9 is a communication sequence of a case in which transmission of the transmission data is completed within a single beacon period since the transmission data held by each of the terminal devices 102 to 104 are equal to or less than a predefined amount. For the communication with the control device 101, the terminal device 102 uses the frequency channel CH1 during a beacon period 301, the terminal device 103 uses the frequency channel CH2 during a beacon period 302, and the terminal device 104 uses the frequency channel CH8 during a beacon period 303. Since the terminal device 102 is in an active state during the beacon period 301, the terminal device 102 receives the beacon frame 310 transmitted by the control device 101. When the terminal device 102 safely receives the beacon frame 310, the terminal device 102 analyzes the payload 503 which is shown in FIG. 7 and which is in the beacon frame 310, and stores, in the memory, the control information that includes the channel-usage sequence.

Next, the terminal device 102 that holds the transmission data performs a carrier sense, and transmits a data frame 311. The control device 101, which has safely received the data frame 311, transmits an ACK frame 312 to the terminal device 102 as a safe-reception response. Since the terminal device 102 holds the remainder of the transmission data, the terminal device 102 similarly transmits a data frame 313 which is next, and receives an ACK frame 314 from the control device 101. In the current example, the terminal device 102 completes transmitting the transmission data in two data frame transmissions.

When the beacon period 301 ends, the control device 101 switches the frequency channel to CH2. The terminal device 102 sets a timer and enters a sleep mode until a time immediately before the start of the beacon period that is assigned with CH2 in the next superframe.

The control device 101 transmits a beacon frame 320 at a start timing of the beacon period 302 which is the next beacon period. At this moment, the beacon period number of the channel-usage sequence in the beacon frame 320 is 2. When the terminal device 103, which is active during the period of the beacon period 302, safely receives the beacon frame 320, the terminal device 103 analyzes the payload 503 in the beacon frame 320, and stores, in the memory, the control information that includes the channel-usage sequence.

Next, the terminal device 103 that holds the transmission data performs a carrier sense, and transmits a data frame 321. The control device 101, which has safely received the data frame 321, transmits an ACK frame 322 to the terminal device 103 as a safe-reception response. In the current example, the terminal device 103 completes transmitting the transmission data in a single data frame transmission.

When the beacon period 302 ends, the control device 101 switches the frequency channel to CH8. The terminal device 103 sets a timer and enters a sleep mode until a time immediately before the start of the beacon period that is assigned with CH8 in the next superframe. The control device 101 transmits a beacon frame 330 at a start timing of the beacon period 303 which is the next beacon period. At this moment, the beacon period number of the channel-usage sequence in the beacon frame 330 is 3. When the terminal device 104, which is active during a period of the beacon period 303, safely receives the beacon frame 330, the terminal device 104 analyzes the payload 503 in the beacon frame 330, and stores, in the memory, the control information that includes the channel-usage sequence.

Next, the terminal device 104 that holds the transmission data performs a carrier sense, and transmits a data frame 331. The control device 101, which has safely received the data frame 331, transmits an ACK frame 332 to the terminal device 104 as a safe-reception response. In the current example, the terminal device 104 completes transmitting the transmission data in a single data frame transmission.

The control device 101 and the terminal devices 102 to 104, all enter a sleep mode in a non-active period 305. In addition, since the next superframe begins when the non-active period 305 ends, the control device 101 switches the channel to CH1, receives a data frame 341 from the terminal device 102, and responds with an ACK frame 342. Subsequently, a similar sequence is repeated.

Figure 10:
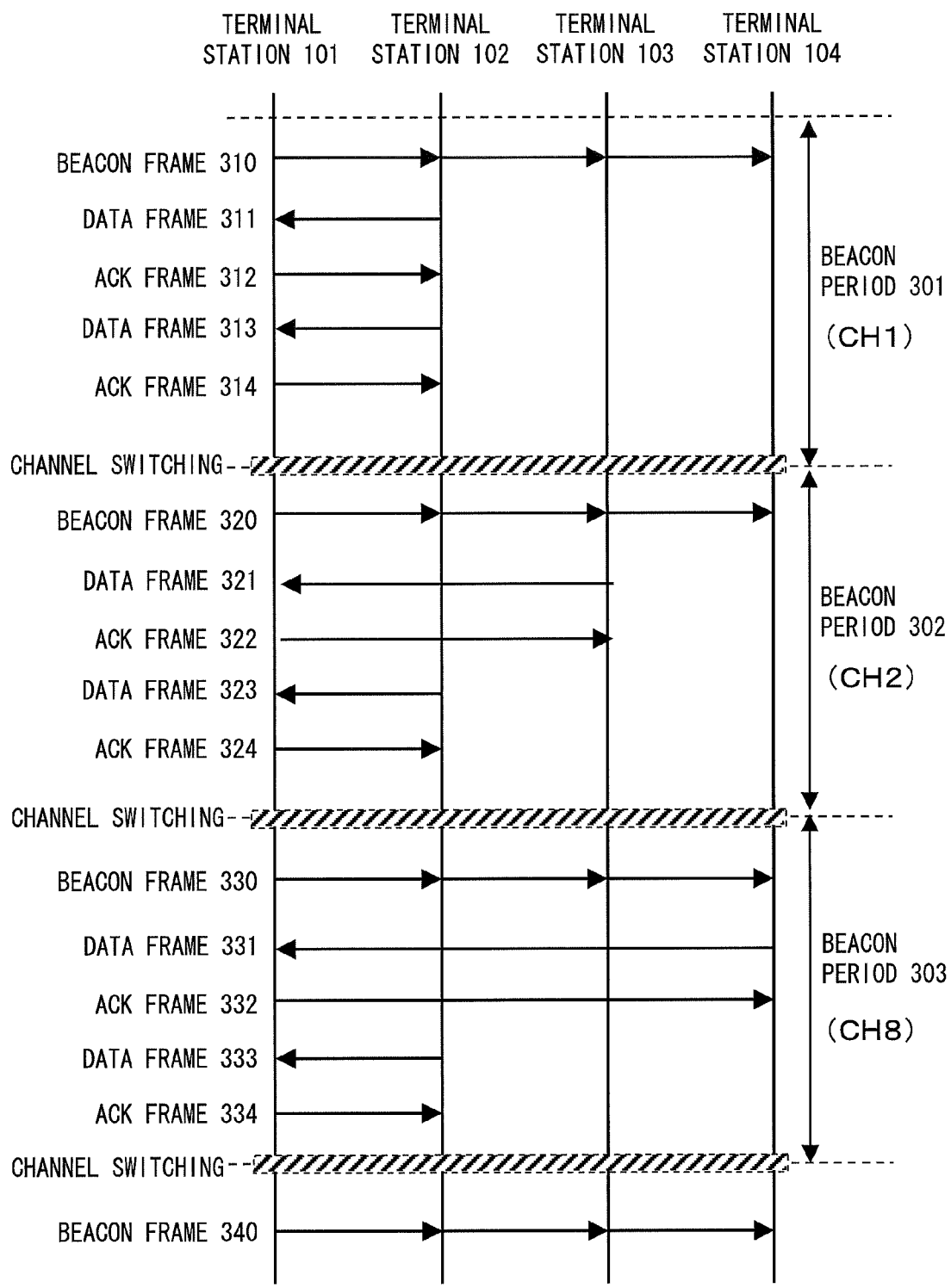
FIG. 10 is a sequence diagram showing one example of a communication sequence according to embodiment 1 of the present invention when a frequency channel is switched.

Described in the following with reference to FIG. 10 is a communication sequence of a case in which transmission of all the transmission data is not possible within a single beacon period since transmission data having equal to or more than the predefined amount is generated in either one of the terminal devices 102 to 104. Each of the terminal devices 102 to 104 manages a continuous transmission and reception flag within oneself, and makes a judgment whether or not a transmission of a data frame held within oneself can be completed during a single beacon period, and holds a result of the judgment by using the continuous transmission and reception flag. Assumed here is a case in which it is not possible to transmit three or more data frames within a single beacon period. Conditions for configuring or removing the continuous transmission and reception flag are: the continuous transmission and reception flag is configured when a transmission data volume that is held is equal to or more than an equivalent of three data frames; and the continuous transmission and reception flag is removed when the transmission data volume that is held is equal to or less than an equivalent of one data frame. Transmission of the beacon frame 310 by the control device 101, transmission of the data frame 311 and reception of the ACK frame 312 by the terminal device 102, and transmission of the data frame 313 and reception of the ACK frame 314 by the terminal device 102, are conducted similarly as in the example shown in FIG. 9. Additionally, operations of the terminal devices 103 and 104 are also conducted similarly as in FIG. 9. Here, it is assumed that the terminal device 102 holds data frames 323 and 333 besides the data frames 311 and 313. Upon receiving the beacon frame 310, the terminal device 102 determines whether all the data frames that are held by the terminal device 102 are transmittable within the period of the beacon period 301. In this case, since a transmission data volume equivalent to four data frames exists, the terminal device 102 determines that it is not transmittable. When determined as being not transmittable, the terminal device 102 configures the continuous transmission and reception flag that is manage by the terminal device 102 itself. Although the transmission of the data frame begins after the continuous transmission flag is being configured, the beacon period 301 ends after the transmission of two data frames, which are the data frames 311 and 313. The remaining two data frames, which are the data frames 323 and 333, cannot be transmitted within the beacon period 301.

At this moment, the terminal device 102 confirms that the continuous transmission flag is configured, retrieves the channel-usage sequence of the control information stored in the memory, comprehends that the control device 101 will conduct a communication by using the frequency channel CH2 in the next beacon period, and enters a sleep mode for the moment. Immediately before the end of the beacon period 301, the terminal device 102 is reactivated, and the terminal device 102 switches to the frequency channel CH2 and waits for the beacon frame 320 that will be transmitted by the control device 101.

When the beacon period 302 which is the next beacon period begins, the control device 101 transmits the beacon frame 320. When the terminal device 102 safely receives the beacon frame 320, the terminal device 102 analyzes the payload in the beacon frame 320, updates and stores, in the memory, the control information that includes the channel-usage sequence. Then, the terminal device 102 determines whether all data frames that are held by the terminal device 102 are transmittable within the period of the beacon period 302. In this case, the transmission data volume that is equivalent to two data frames are remaining in the terminal device 102. CH2 has been originally assigned to the terminal device 103, and it can be assumed that one or more of the data frame 321 will be transmitted from the terminal device 103. Thus, when the transmission data volume in the terminal device 102 is equivalent to two data frames, there is a high possibility that the transmission cannot be completed. Therefore, the continuous transmission and reception flag is not removed until the transmission data volume becomes equivalent to one data frame. In this case, the terminal device 102 is maintaining a state in which the continuous transmission and reception flag manage by the terminal device 102 itself is being configured.

Next, when the terminal device 102 judges that a wireless communication medium is idle as a result of a carrier sense, the terminal device 102 transmits the data frame 323 to the control device 101. Here, the wireless communication medium is the predefined frequency channel used for the communication.

At this moment, information regarding a change of the used frequency channel to CH2 is written in the frame control code 511 of the MAC header 502, shown in FIG. 7 and FIG. 8, in the data frame 323; and is notified to the control device 101. The control device 101 that received the data frame 323 transmits an ACK frame 324 to the terminal device 102 as a safe-reception response. Then, the control device 101 analyzes the received MAC header 502 of the data frame 323, and comprehends that the terminal device 102 has changed the frequency channel for use. The terminal device 102 stores, in the memory, information regarding the fact that the transmission of the data frame could not be finished by using the frequency channel CH1.

Then, the beacon period 302 ends without the terminal device 102 transmitting the remainder of the data frame 333.

The terminal device 102 confirms that the continuous transmission and reception flag is configured, retrieves the channel-usage sequence included in the memory, comprehends that the control device 101 will conduct a communication by using the frequency channel CH8 in the next beacon period, and enters a sleep mode for the moment. Immediately before the end beacon period 302, the terminal device 102 is reactivated, and the terminal device 102 switches to the frequency channel CH8 and waits for the beacon frame 330 that will be transmitted by the control device 101.

When the control device 101 switches the frequency channel to CH8 and when the beacon period 303 which is the next beacon period begins, the beacon frame 330 is transmitted. When the terminal device 102 safely receives the beacon frame 330, the terminal device 102 analyzes the payload 503 in the beacon frame 330, and updates and stores, in the memory, the control information that includes the channel-usage sequence.

When the terminal device 102 receives the beacon frame 330, the terminal device 102 determines whether the data frames that are held are transmittable within the period of the beacon period 303. Here, since a transmission data volume that is equivalent to one data frame only remains, the terminal device 102 determines that it is transmittable, and removes the continuous transmission and reception flag managed by the terminal device 102 itself.

Next, when the terminal device 102 judges that the wireless communication medium is idle as a result of a carrier sense, the terminal device 102 transmits the data frame 333 to the control device 101. At this moment, information regarding a change of the used frequency channel to CH8 is written in the frame control code 511 of MAC header 502 in the data frame 333; and is notified to the control device 101. The control device 101 that received the data frame 333 transmits an ACK frame 334 to the terminal device 102 as a safe-reception response. Then, the control device 101 analyzes the received MAC header 502 of the data frame 333; comprehends that the terminal device 102 has changed the frequency channel for use; and the terminal device 102 stores, in the memory, information regarding the fact that the transmission of the data frame could not be finished by using the frequency channels CH1 and CH2.

Here, since the transmission of the data frames 323 and 333, which could not be transmitted in the beacon period 301, has been completed in the beacon periods 302 and 203; the terminal device 102 switches the frequency channel to the originally assigned CH1, and sets a timer and enters a sleep mode until a time immediately before the start of the beacon period that is assigned with CH1 in the next superframe.

Subsequently, an operation similar to that in FIG. 9 is repeated for the communication sequence between the control device 101 and each of the terminal devices 102 to 104.

There is a possibility of an overflow of the data frame from a buffer if the terminal device 102, cannot transmit, within the beacon period 301, the data frame that should be transmitted in the beacon period 301, and holds the data frame until the beacon period 305 assigned with CH1. Furthermore, a transmission delay is generated if the data frame is data that requires a real time transmission such as an audio. However, according to the present embodiment, it is possible to shorten the transmission delay since the terminal device 102 continues the transmission by switching the channel when the data frame cannot be transmitted in the beacon period 301 assigned with CH1. With a conventional technology, a delay, up till the beginning of the beacon period assigned with CH1 in the next superframe, is generated. For example, when there are eight types of channels as shown in FIG. 12, at most, the transmission delay can be shortened to one-eighth compared to the conventional technology even without taking into consideration of the non-active period. If the non-active period is taken into consideration, shortening to one-eighth or less is possible.

In the present embodiment, although the terminal device 102 momentarily goes to sleep when switching the channel, the present invention is not limited thereto and the terminal device 102 does not necessary have to go to sleep.

In the present embodiment, although the conditions for configuring or removing the continuous transmission and reception flag are: the continuous transmission and reception flag is configured when the transmission data volume that is held is equal to or more than the equivalent of three data frames; and the continuous transmission and reception flag is removed when the transmission data volume that is held is equal to or less than the equivalent of one data frame, the conditions are not limited to these, and may be appropriately configured based on the number of data frames transmittable in a single beacon period. For example, the terminal devices 102 to 104 can determine the condition by: calculating a required time for the transmission of the data frame by using, as parameters, a total size of the data frame and a bit rate at which the transmission can be conducted by themselves; and comparing the required time to a time of the beacon period included in the beacon frame.

In the present embodiment, the control device 101 causes, the data frame 321 from the terminal device 103 during the beacon period 302, and the data frame 331 from the terminal device 104 during the beacon period 303, to be respectively transmitted before the data frames 323 and 333 from the terminal device 102. However, for example, the data frame from the terminal device 102 may be given priority and may be received without interruptions. In this case, since the control device 101 comprehends that the transmission of the data frame from the terminal device 102 has not been completed, the control device 101 can further incorporate, into the beacon frame 320 and the beacon frame 330, instructions for terminal devices other than the terminal device 102 to delay timings for transmitting data frames included in the terminal devices themselves, and can transmit the beacon frames 320 and 330. In this case, the terminal devices 103 and 104, which have respectively received the beacon frames 320 and 330, can allow wireless communication media to be idle at the time when the terminal device 102 conducts a carrier sense by delaying respective timings for transmitting the data frames 321 and 331; as a result, the data frames 323 and 333 can be transmitted from the terminal device 102 with priority.

Figure 13:
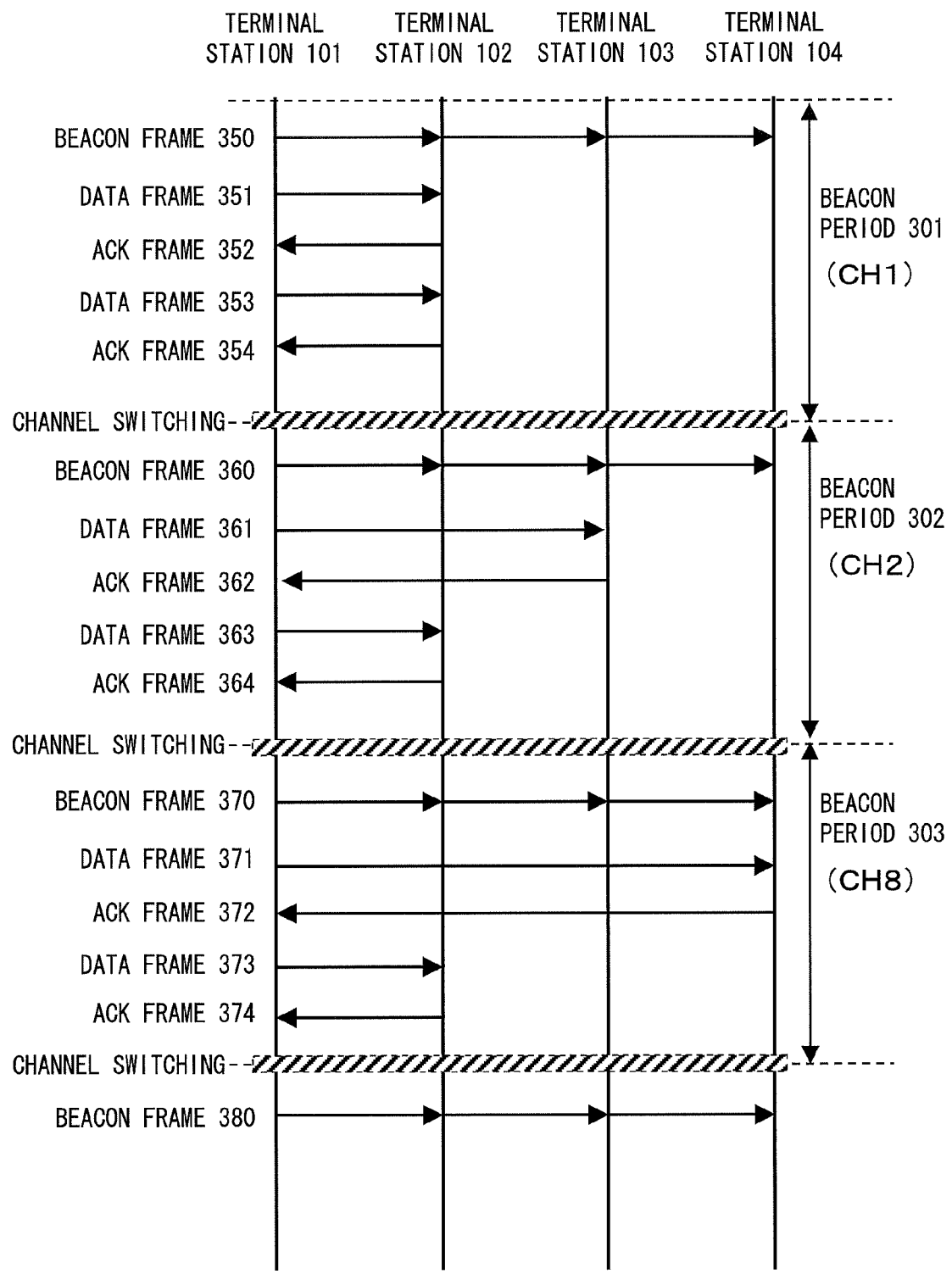
FIG. 13 is a sequence diagram showing one example of a communication sequence according to embodiment 1 of the present invention when a frequency channel is switched.
Figure 14:
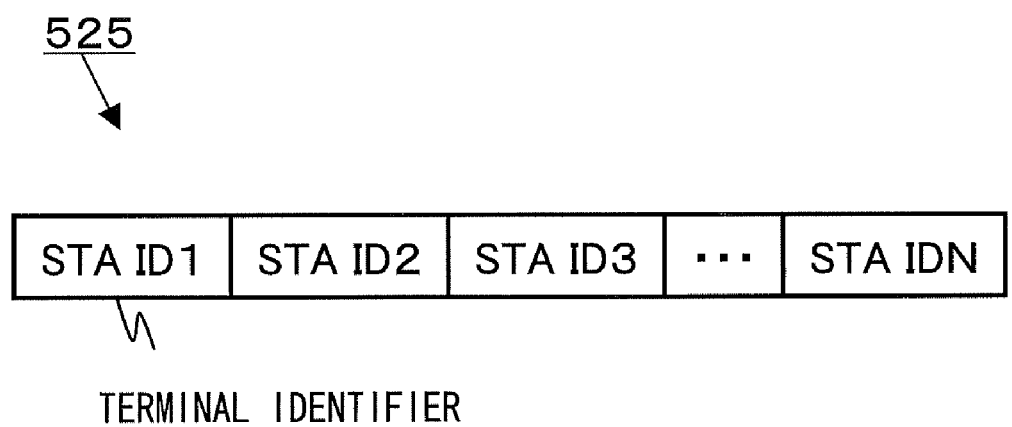
FIG. 14 is a schematic diagram showing a continuous transmission terminal identifier in the payload of the beacon frame according to embodiment 1 of the present invention.

Described in the following with reference to FIG. 13 and FIG. 14 is a process in which the control device 101 instructs the terminal devices 102 to 104 to switch the channel and conducts transmission and reception of the data frame, when a data volume equal to or more than the predefined amount is generated at the control device 101. FIG. 13 is a figure showing a communication sequence between the control device 101 and the terminal devices 102 to 104.

Here, first the continuous transmission terminal identifier 525 shown in FIG. 11 will be described with reference to FIG. 14. FIG. 14 is a figure showing one example of a configuration of the continuous transmission terminal identifier 525. When the control device 101 determines, in each beacon period, that the transmission of the data frame which is held in the control device 101 itself and which is destined to a terminal device that conducts a communication during the beacon period, will not be completed; the control device 101 configures an identifier of the terminal device which is a transmission destination of the data frame. The identifier may be an ID used for authentication, or may be the address information of the terminal.

Assumed here is a case in which a data volume in the control device 101 destined to the terminal device 102 is equal to or more than the predefined amount, and the data volume is equivalent to four data frames; thus, the transmission thereof will not be completed in a single beacon period. The one that conducts the communication during the beacon period 301 is the terminal device 102; and since the transmission of the data frame destined to the terminal device 102 is determined not to be completed, the control device 101 configures an identifier of the terminal device 102 in the continuous transmission terminal identifier 525 of a beacon frame 350, and transmits the beacon frame 350. Here, a transmittability determining method is similar to the case of the determining method described above where the data volume on a terminal device side is equal to or more than the predefined amount.

Since the terminal device 102 is in an active state during the beacon period 301, the terminal device 102 receives the beacon frame 350 transmitted by the control device 101. When the terminal device 102 safely receives the beacon frame 350, the terminal device 102 analyzes the payload 503 in the beacon frame 350, and stores, in the memory, the control information that includes the channel-usage sequence. In addition, the terminal device 102 recognizes that the ID of the terminal device 102 itself is configured in the continuous transmission terminal identifier. The terminal device 102, when the ID thereof is configured as described above, configures the continuous transmission and reception flag.

Next, the control device 101 conducts a carrier sense, and transmits a data frame 351. The terminal device 102, which safely received the data frame 351, transmits an ACK frame 352 to the control device 101 as a safe-reception response. Similarly, the control device 101 transmits a data frame 353 which is next, and receives an ACK frame 354 from the terminal device 102.

When the beacon period 301 ends, the control device 101 sets a time, which is obtained by subtracting a time required for switching the frequency channel from a start time of the beacon period 302 which is the next beacon period, in a timer; and enters a sleep mode by blocking the supply of power to the functional block that is necessary for the wireless communication.

Since the continuous transmission terminal identifier of the terminal device 102 itself is written in the beacon frame 350, the terminal device 102 retrieves the channel-usage sequence included in the memory, comprehends that the control device 101 will conduct a communication by using the frequency channel CH2 in the next beacon period, switches the frequency channel to CH2, and waits for a beacon frame 360 that will be transmitted from the control device 101. The control device 101 switches the frequency channel to CH2 after recovering from the sleep mode. Those that communicate in the beacon period 302 are the terminal devices 102 and 103. Since data, which is destined to the terminal device 102 and which is equivalent to two data frames, is untransmitted; the control device 101 determines that the data transmission will not be completed even in the beacon period 302. Since a single data frame is sufficient for the transmission of the data volume destined to the terminal device 103, it is determined that the data transmission will be completed in the beacon period 302. Therefore, the control device 101 configures only the identifier of the terminal device 102 in the continuous transmission terminal identifier 525 of the beacon frame 360, and transmits the beacon frame 360.

When the terminal devices 102 and 103 safely receive the beacon frame 360, the terminal devices 102 and 103 analyze the payload 503 in the beacon frame, and update and store, in the memory, the control information that includes the channel-usage sequence. Additionally, the terminal device 102 recognizes that the ID of the terminal device 102 itself is configured in the continuous transmission terminal identifier 525. Since the ID of the terminal device 102 itself is configured, the terminal device 102 configures the continuous transmission and reception flag.

Next, the control device 101 conducts a carrier sense, and transmits a data frame 361. The terminal device 103, which safely received the data frame 361, transmits an ACK frame 362 to the control device 101 as a safe-reception response. Similarly, the control device 101 transmits a data frame 363 to the terminal device 102, and receives an ACK frame 364 from the terminal device 102.

When the beacon period 302 ends, the control device 101 sets a time, which is obtained by subtracting the time required for switching the frequency channel from a start time of an active time period 303 which is the next beacon period, in the timer; and enters a sleep mode by blocking the supply of power to the functional block that is necessary for the wireless communication.

Since the continuous transmission terminal identifier of the terminal device 102 itself is written in the beacon frame 360, the terminal device 102 retrieves the channel-usage sequence included in the memory, comprehends that the control device 101 will conduct a communication by using the frequency channel CH8 in the next beacon period, switches the frequency channel to CH8, and waits for a beacon frame 370 that will be transmitted from the control device 101.

Then, the terminal device 103 sets a timer and enters a sleep mode until a time immediately before the start of the beacon period that is assigned with CH2 in the next superframe.

The control device 101 switches the frequency channel to CH8 after recovering from the sleep mode. Those that communicate in the beacon period 303 are the terminal devices 102 and 104. Since a single data frame is sufficient for the transmission of the data volume destined to the terminal device 102 and the data volume destined to the terminal device 103, the control device 101 determines that the data transmission to the terminal devices 102 and 104 will be completed in the beacon period 303. Therefore, the control device 101 does not configure, in the continuous transmission terminal identifier 525 of the beacon frame 370, identifiers of either of the terminal devices, and transmits the beacon frame 370. When the terminal devices 102 and 104 safely receive the beacon frame 370, the terminal devices 102 and 104 analyze the payload 503 in the beacon frame 370, and update and store, in the memory, the control information that includes the channel-usage sequence. Additionally, the terminal device 102 removes the continuous transmission and reception flag since the ID of the terminal device 102 itself is not configured.

Next, the control device 101 conducts a carrier sense, and transmits a data frame 371 to the terminal device 104. The terminal device 104, which safely received the data frame 371, transmits an ACK frame 372 to the control device 101 as a safe-reception response. Similarly, the control device 101 transmits a data frame 373 to the terminal device 102, and receives an ACK frame 374 from the terminal device 102.

When the beacon period 303 ends, the control device 101 sets a time, which is obtained by subtracting the time required for switching the frequency channel from the start time of the active time period which is the next beacon period, in the timer; and enters a sleep mode by blocking the supply of power to the functional block that is necessary for the wireless communication.

The terminal device 102 and 104 respectively set timers and enter sleep modes until times immediately before the start of the beacon periods that are assigned respectively with CH1 and CH3 in the next superframe.

Subsequently, between the control device 101 and each of the terminal devices 102 to 104, an operation similar to that in FIG. 9 is repeated in the communication sequence.

There is a possibility of an overflow of the data frame from the buffer if the control device 101, cannot transmit, within the beacon period 301, the data frame that should be transmitted in the beacon period 301, and holds the data frame until the beacon period 302 which is when CH2 will be used next. Furthermore, a transmission delay is generated if the data frame is data that requires a real time transmission such as an audio. However, according to the present invention, it is possible to shorten the transmission delay since the control device 101 continues the transmission within the beacon period 302 by configuring, in the beacon frame 350, in advance, information indicating an instruction to switch the channel when the data destined to the terminal device 102 cannot be transmitted in the data frame during the beacon period 301 assigned with CH1. With the conventional technology, a delay, which is a period up till the beginning of the beacon period assigned with CH1 in the next superframe, is generated. For example, when there are eight types of channels as shown in FIG. 12, at most, the transmission delay can be shortened to one-eighth when compared to the conventional technology even without taking into consideration of the non-active period. If the non-active period is taken into consideration, shortening to one-eighth or less is possible.

In the present embodiment, the control device 101 transmits, the data frame 361 to the terminal device 103 in the beacon period 302, and the data frame 371 to the terminal device 104 in the beacon period 303, respectively before the data frames 363 and 373 which are destined to the terminal device 102; however, the present invention is not limited thereto. For example, the data frame of the terminal device 102 may be transmitted with priority.

In the present embodiment, although the control device 101 has entered a sleep mode when switching the channel of the beacon period, the present invention is not limited thereto. And, for example, does not necessary have to go to sleep.

Next, internal processes of the control device 101 and the terminal devices 102 to 104, which process a processing sequence described above, will be described with reference to FIG. 15 to FIG. 21.

Figure 15:
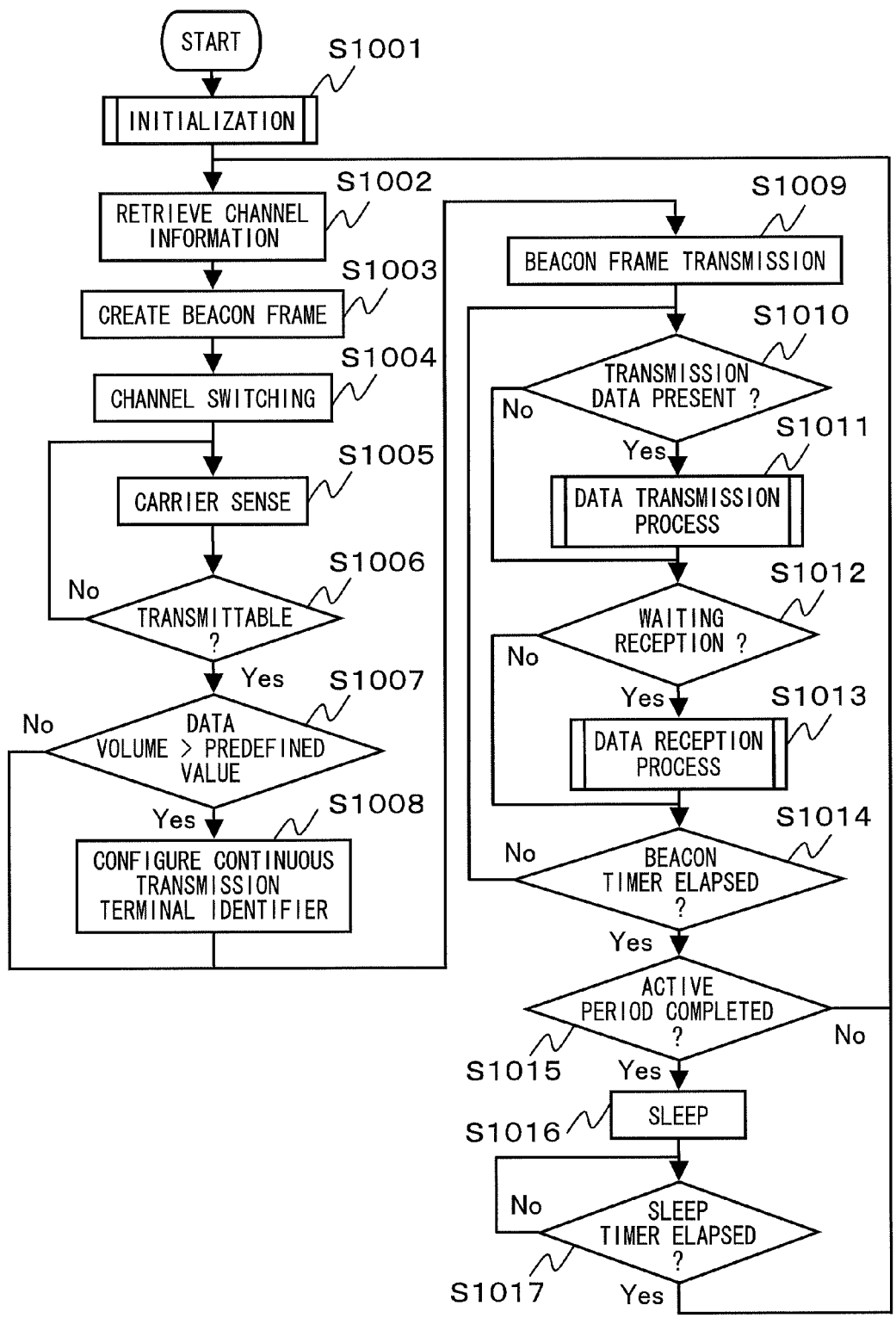
FIG. 15 is a flowchart showing a process of the control device according to embodiment 1 of the present invention.
Figure 16:
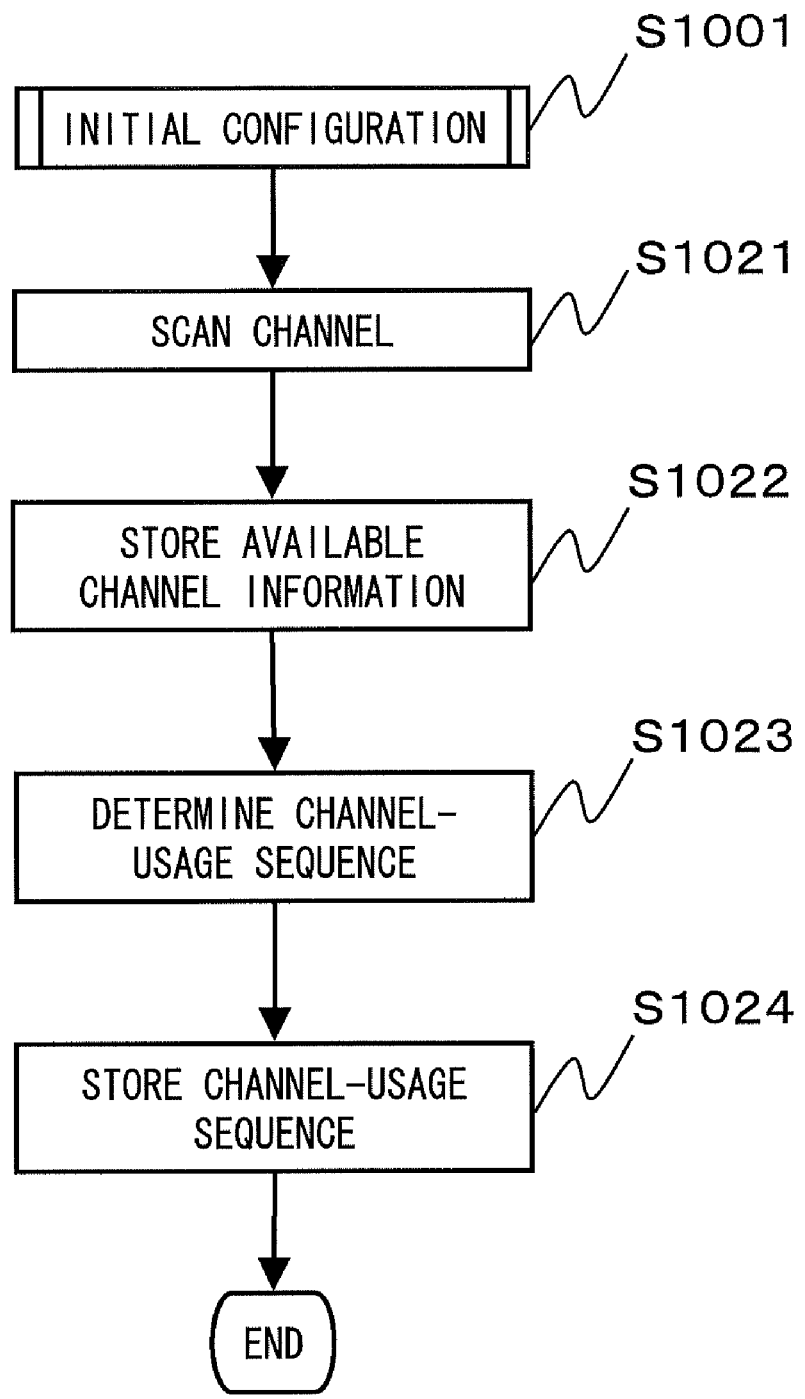
FIG. 16 is a flowchart showing an initial configuration process of the control device according to embodiment 1 of the present invention.

FIG. 15 is a figure showing the whole process flow of the control device 101; and FIG. 16 is a figure showing a process flow of the control device 101 at the time of initialization.

In FIG. 15, the control device 101 first conducts an initialization at step S1001. Details of the initialization are shown by steps S1021 to S1024 in FIG. 16. At step S1021, available frequency channels are obtained after sequentially scanning whether any of the available frequency channels are used by other terminal devices or whether there is an influence of an interference, by conducting an electric power measurement and the like. At step S1022, information of the available frequency channels, which is obtained at step S1021, is store in the memory. Next, at step S1023, the frequency channel is randomly selected from the available frequency channels based on the number of beacon periods that is held as system information; and the channel-usage sequence is determined. At step S1024, the determined channel-usage sequence is stored in the memory, and an initialization configuring process ends.

Next, at step S1002 in FIG. 15, channel information of the wireless network held in the memory, such as the superframe period, the beacon period, the channel-usage sequence interval, and the like, are retrieved. At step S1003, the beacon frame is created based on the channel information retrieved at step S1002; and at step S1004, it is switched to the frequency channel which is first in the channel-usage sequence retrieved at S1002. At step S1005, when transmitting the beacon frame, a carrier sense is conducted at the beginning of the beacon period in order to determine whether or not the wireless communication medium is idle. At step S1006, if the carrier sense conducted at step S1005 has returned a level equal to or less than a predefined level, it is judged that a beacon frame transmission is possible, and step S1007 and further are executed. If the carrier sense conducted at step S1005 has returned a level equal to or more than the predefined level, it is judged that the frequency channel is in use and that the beacon frame transmission is not possible, and step S1005 is executed in order to conducted a carrier sense again.

When the beacon frame transmission is judged to be possible at step S1006, at step S1007, it is determined whether the data frame to be transmitted in the beacon period after the beacon frame transmission is transmittable within the beacon period; and if it is not transmittable, at step S1008, the continuous transmission terminal identifier of the terminal device is configured in the beacon.

Next, at step S1009, the beacon frame is transmitted. Subsequently, in order to conduct the transmission and reception of the data frame and the like between the control device 101 and the terminal devices 102 to 104, a data transmission process and a data reception process at steps S1010 to S1013 are repeated. Each of the processes from steps S1010 to S1013 is repeated until the beacon period ends at step S1014; and when the beacon period ends, a completion of the beacon period is determined at step S1015. When the beacon period is not ended, it returns to S1002.

Lastly, when the beacon period ends at step S1015, the terminal device enters a sleep mode at step S116, and remains in the sleep mode until a sleep timer at step S1107 elapses again. After the sleep timer elapses, it returns to step S1002, and subsequently, the processes are repeated.

Figure 17:
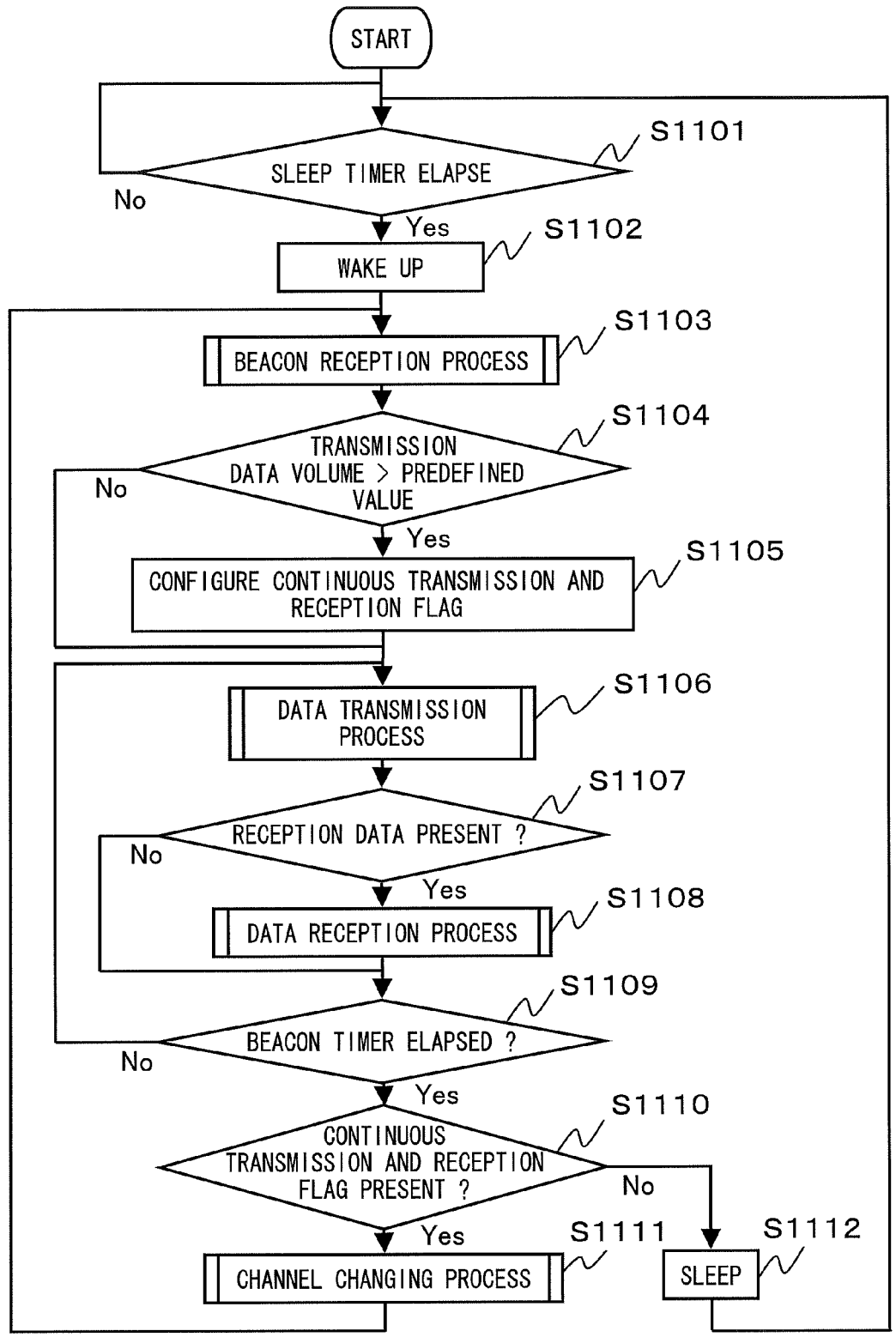
FIG. 17 is a flowchart showing a process of the terminal device according to embodiment 1 of the present invention.
Figure 19:
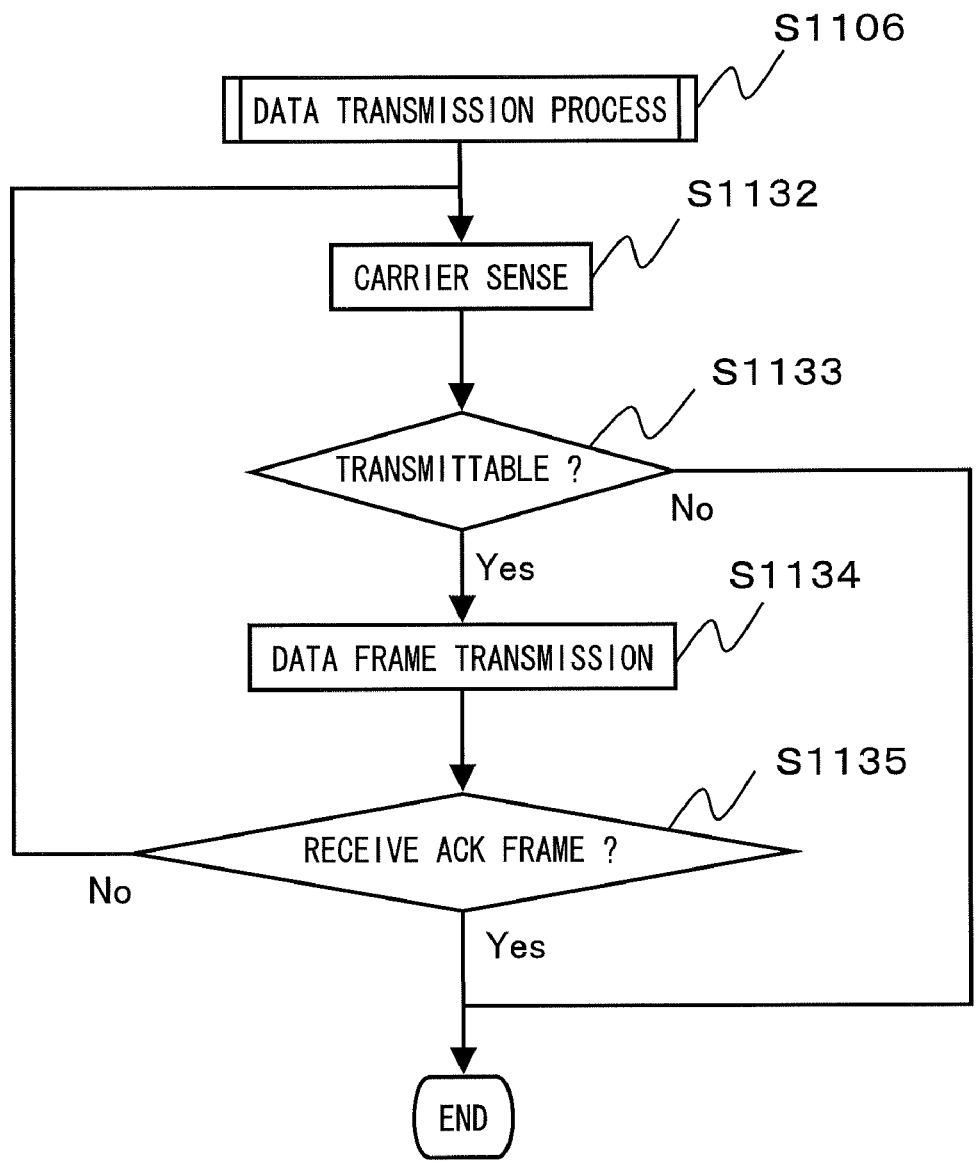
FIG. 19 is a flowchart showing a data frame transmission process of the control device•terminal device according to embodiment 1 of the present invention.
Figure 20:
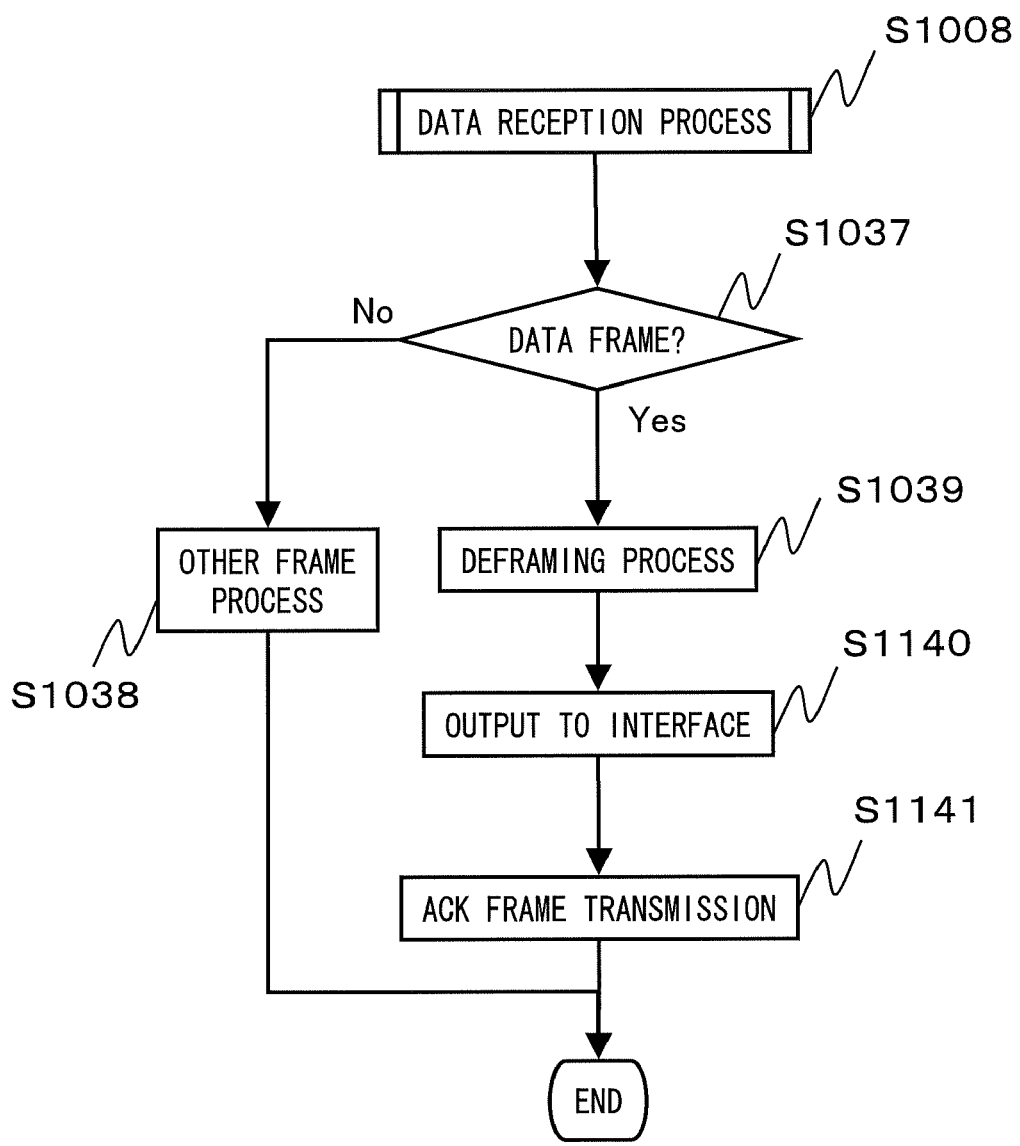
FIG. 20 is a flowchart showing a data reception process of the control device•terminal device according to embodiment 1 of the present invention.
Figure 21:
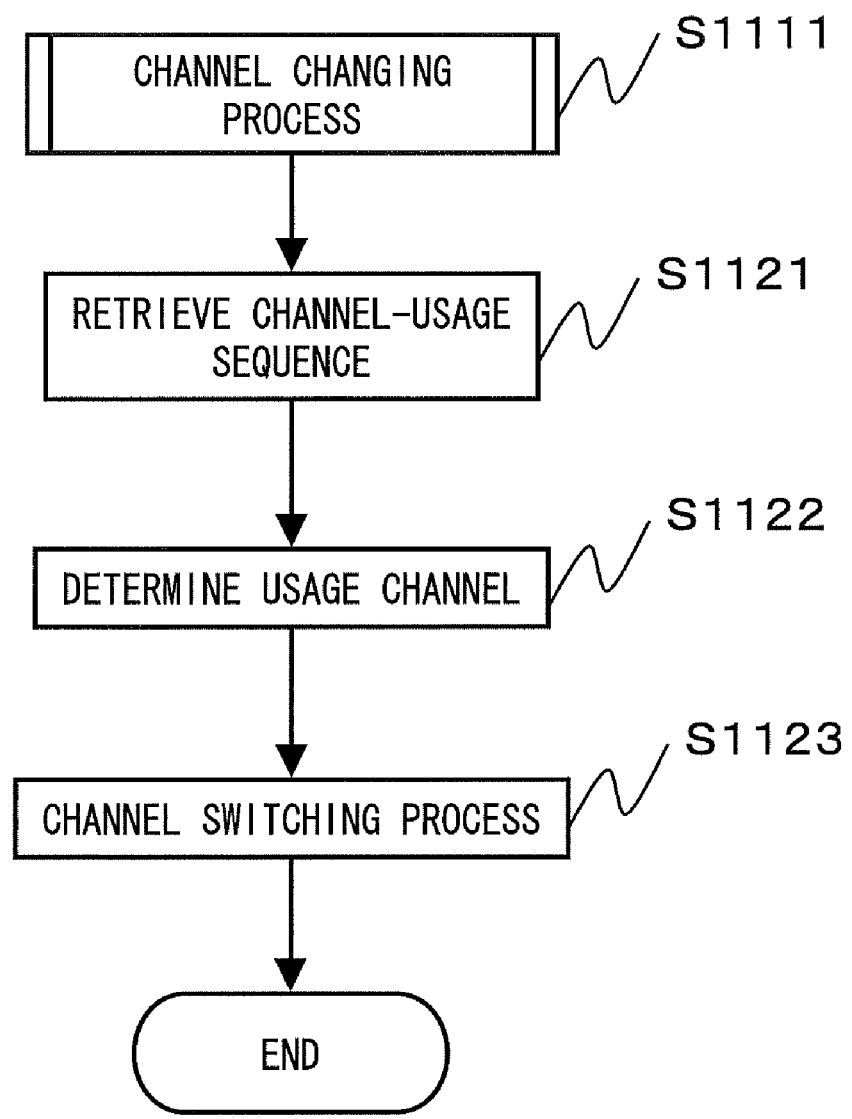
FIG. 21 is a flowchart showing a channel changing process of the terminal device according to embodiment 1 of the present invention.

FIG. 17 is a figure showing the whole process flow of the terminal device 102; FIG. 18 is a figure showing a process flow of a beacon frame reception of the terminal device 102; FIG. 19 is a figure showing a process flow of a data transmission process of the terminal device 102; FIG. 20 is a figure showing a process flow of a data reception process of the terminal device 102; and FIG. 21 is a figure showing a process flow at the time of a channel changing process of the terminal device 102. Process flows of the other terminal devices 103 and 104 that are joining the wireless network 100 are similar to that of the terminal device 102.

Assumed in FIG. 17 is a case where, at the moment when the process starts, the terminal device 102, has finished a process 101 of joining the wireless network 100 with the control device, has recognized a timing of the superframe period and the beacon period, and has entered a sleep mode.

When the sleep timer elapses at step S1101, the terminal device exits the sleep mode and is activated at step S1102. At step S1103, a beacon frame reception process is conducted.

A beacon reception processing step S1103 will be described in detail with reference to FIG. 18. When the beacon frame is safely received, the terminal device analyzes the payload in the beacon frame at step S1141, extracts the channel-usage sequence, and updates information of the channel-usage sequence by storing the extracted channel-usage sequence. In addition, at step S1142, the terminal device analyzes the continuous transmission terminal identifier in the payload of the beacon frame, and when the identifier of the terminal device itself is configured, configures the continuous transmission and reception flag at step S1143. When the identifier of oneself is not configured, the terminal device does not configure the continuous transmission and reception flag. With this, the beacon reception process ends.

After finishing the beacon frame reception process at step S1103, the terminal device 102 checks whether or not the transmission data volume held by the terminal device 102 itself exceeds the predefined amount at step S1104, and determines whether all data frames to be transmitted are transmittable in the current beacon period.

At step S1104, when it is determined that the transmission data volume exceeds the predefined amount and that the transmission is not possible, the continuous transmission and reception flag is configured at step S1105 and the process proceeds to step S1106. Furthermore, when it is determined that the transmission data volume does not exceed the predefined amount and that the transmission is possible, the continuous transmission and reception flag is not configured and the process proceeds to step S1106.

Next, the terminal device 102 repeatedly conducts processes of transmission and reception of the data frame, which are at step S1106 to step S1108, until a beacon timer configured with a completion timing of the current beacon period is completed.

Here, the data transmission process at step S1106 will be described with reference to FIG. 19. At step S1132, the terminal device 102 conducts, before starting the transmission of the data frame, a carrier sense in order to judge whether or not the wireless communication medium is idle. At step S1133, the process proceeds to step S1134 when it is judged that the wireless communication medium is in an idle mode as a result of the carrier sense at step S1132, and the transmission process of the data frame is conducted. At step S1135, a response as an ACK frame from the control device 101 is being waited for, and when the ACK frame is safely received, the data transmission process ends. When the wireless communication medium is not idle at step S1133, and when it has timed-out without being able to receive the ACK frame from the control device 101 at step S1135, the process proceeds to step S1132 and the carrier sense is conducted again.

The data transmission process of the control device 101 at step S1011 is similar to the data transmission process of the terminal device.

Next, the data reception process at step S1108 will be described with reference to FIG. 20.

The terminal device 102 confirms whether the received frame is a data frame at step S1037.

When the received frame is not a data frame, another frame process that is predetermined is conducted at step S1038. When the received frame is a data frame, the process proceeds to step S1039, and a deframing process is conducted on the receive data frame and data is extracted; and the process proceeds to step S1140 and the data is outputted to an interface. Then, an ACK is transmitted at step S1141 and the processes end.

Lastly, when the beacon timer elapses at step S1109, the terminal device 102 confirms the continuous transmission and reception flag at step S1110. If the continuous transmission and reception flag is not configured, the terminal device 102 enters a sleep mode at step S1112, and remains in the sleep mode until a sleep timer at step S1101 elapses again.

However, if the continuous transmission and reception flag is configured after confirming the continuous transmission and reception flag at step S1110, switching of the channel is conducted at step S1111.

The data reception process of the control device 101 at step S1013 is similar to the data reception process of the terminal device.

Details of the channel changing processing step S1111 will be described with reference to FIG. 21. First, at step S1121, the channel-usage sequence in the memory is retrieved. Next, at step S1122, the frequency channel of the beacon period, which follows the frequency channel currently in use and which is written in the channel-usage sequence, is selected; and, at step S1123, the frequency channel is switched to the selected frequency channel.

With the processes described above, the terminal device 102 can avoid influences of a data transmission delay and the like, by rapidly switching the frequency channel in use, depending on the data to be transmitted by the terminal device 102 itself or depending on the data volume that is transmitted by the control device 101.

In the present embodiment, although the terminal device 102 has configured the continuous transmission and reception flag depending on the data volume held by the terminal device 102 itself immediately after the beacon reception; the present invention is not limited thereto. For example, configuring may be conducted at an end the wireless communication period of each frequency channel, or at a certain time, which is set up in advance, before the end. Furthermore, configuring of the continuous transmission and reception flag may be determined, not depending on the whole data volume, but if even a single data frame, which is untransmitted or which transmission thereof has failed, is remaining.

In the present embodiment, although the control device 101 instructs the switching of the frequency channel to the terminal device 102 by using the continuous transmission terminal identifier 525 of the beacon frame, shown in FIG. 11; the present invention is not limited thereto. For example, the control device 101 may configure the continuous transmission terminal identifier to the data frame that is transmitted to the terminal device 102. Or else, when transmitting the data frame, if the control device 101 is holding any other data frames, which are other than the data frame, to be transmitted, the control device 101 may incorporate a flag indicating this situation in the data frame and may transmit the data frame. After recognizing the flag and when the next data frame is not received in the same beacon period, the terminal device 102 may switch to the channel assigned to the next beacon period and may continue the reception.

Figure 22:
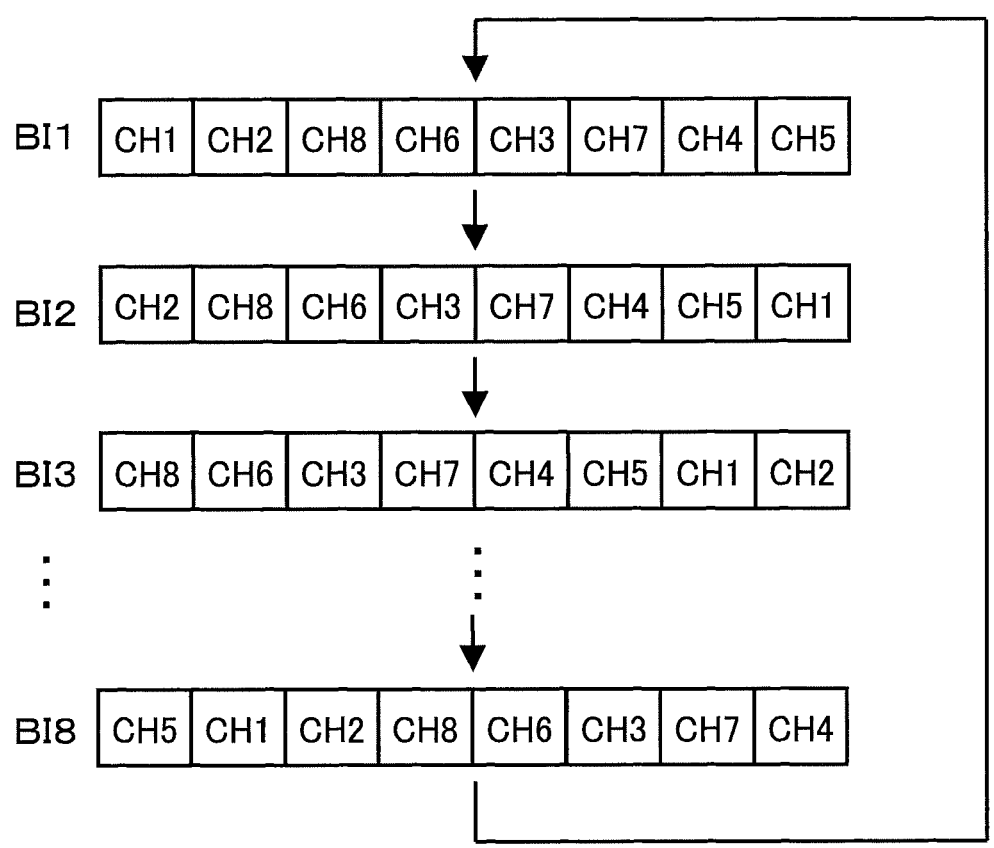
FIG. 22 is a schematic diagram showing another channel-usage sequence in the payload of the beacon frame according to embodiment 1 of the present invention.

In the embodiment described above, although a configuration shown in FIG. 12 has been used as a configuration of the channel-usage sequence 524 in the beacon frame, a configuration shown in FIG. 22 may be used as another configuration. In the configuration shown in FIG. 22, instead of using the beacon period number BN, the frequency channels are arranged according to a sequence of usage, and a frequency channel arranged in the first position constantly indicates the frequency channel that is currently in use, and the channel-usage sequence is rotated every time the beacon period ends. With such configuration, in every beacon period, it can be understood that, the channel held at a first position is the channel that is currently in use, and the channel held at a second position is the frequency channel that will be used in the next beacon period. For example, in a beacon period BI3, it can be understood that, the frequency channel in use in the current beacon period is CH8, the frequency channel which will be used in the next beacon period is CH6, and the frequency channel which will be used in the beacon period immediately after the next beacon period is CH3.

In the embodiment described above, as shown in FIG. 4, described as an example is a case where a non-active period common to the whole wireless network 100 is configured; however, the non-active period common to the whole wireless network 100 does not necessary have to be configured. In this case, from a standpoint of the control device 101, an advantageous effect of a power consumption reduction cannot be obtained since a non-active period does not exist and the control device 101 conducts communication as constantly being in an active period; however, from standpoints of the terminal devices 102 to 104, the advantageous effect of the power consumption reduction can be obtained since a communication is not conducted in wireless communication periods other than the wireless communication period of the frequency channel in use. From a standpoint of the whole wireless network 100, the case in which the non-active period common to the whole wireless network 100 is not configured results in a state in which the wireless communication period is configure in either of the frequency channels at any time point; therefore, at a time point when data, which has to be transmitted with urgency, is generated, each of the terminal devices 102 to 104 can communicate with the control device 101 at any time by receiving a beacon after switching to the frequency channel in use based on the channel-usage sequence.

Figure 23:
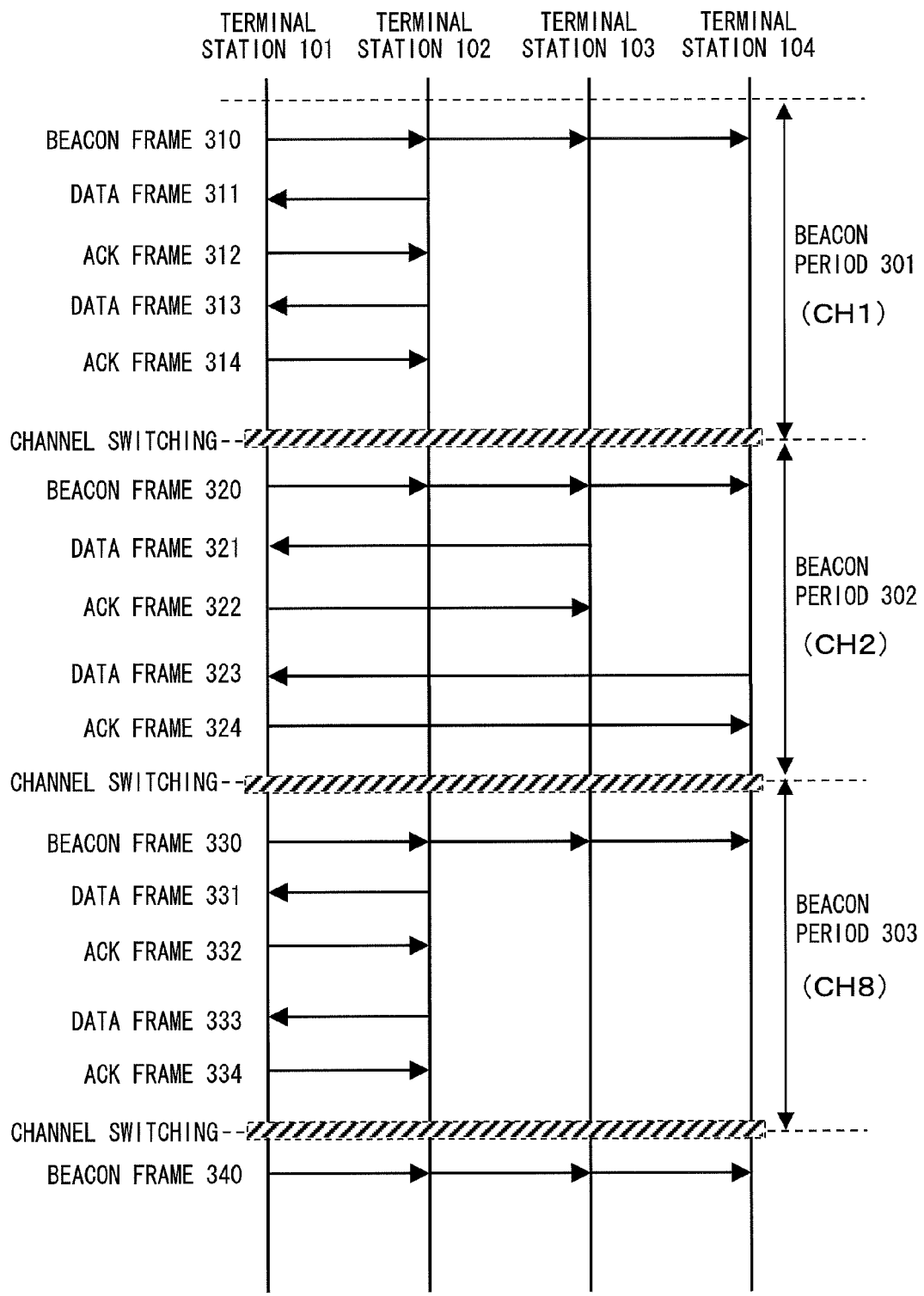
FIG. 23 is a sequence diagram showing one example of a communication sequence according to embodiment 1 of the invention.
Figure 24:
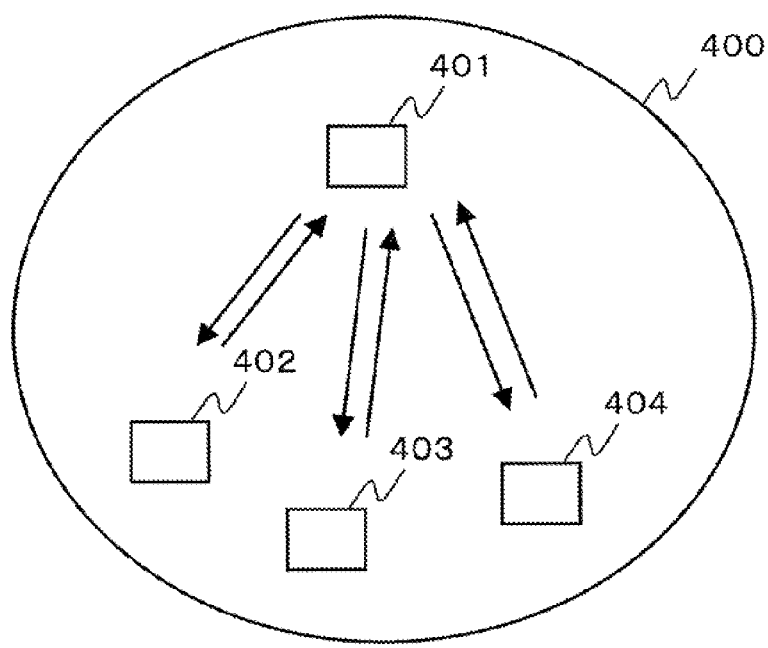
FIG. 24 is a configuration figure of a conventional wireless communication system.
Figure 25:
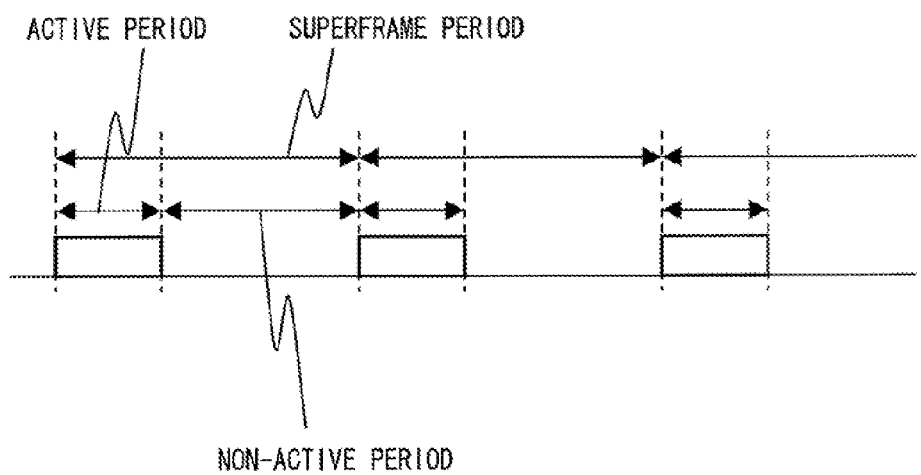
FIG. 25 is a schematic diagram showing a configuration of a conventional superframe.
Figure 26:
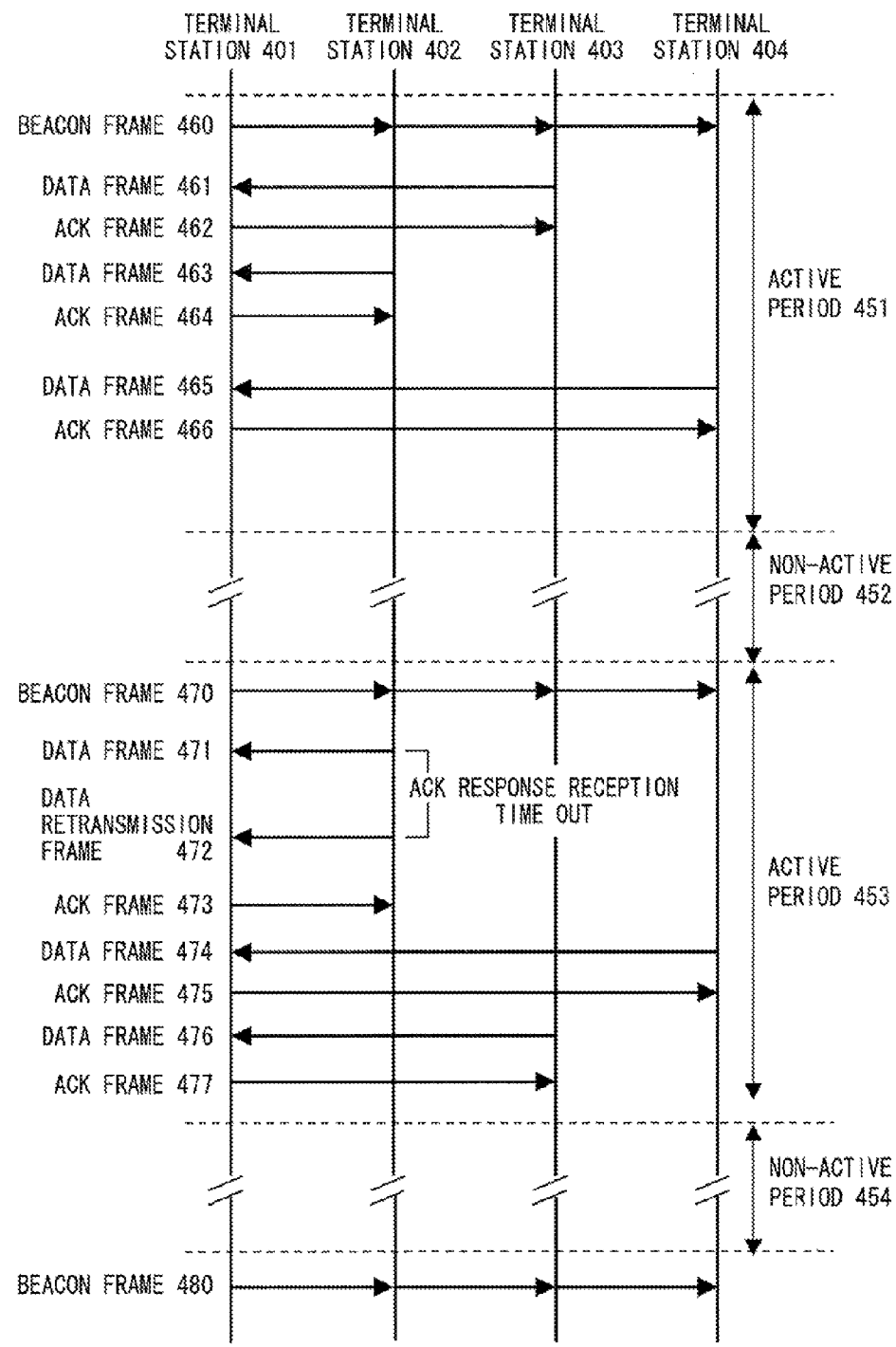
FIG. 26 is a sequence diagram showing one example of a conventional communication sequence.

In the embodiment described above, as shown in FIG. 10, described as an example is a case where the data frame that could not be transmitted by the terminal device 102 in the beacon period 301 is transmitted in the beacon period 302 immediately after the beacon period 301; however, it is also possible to wait, instead of conducting the communication, during the beacon period 302 and start the communication in the beacon period 303. The reason behind such way of conducting is because a transmission efficiency of the whole wireless network 100 can be reduced as a result of a high possibility of an collision between data frames if, for example, the terminal device 102 conducts the communication in the beacon period 302 when the number of terminal devices that are using the frequency channel CH2 is large. In this case, as shown in FIG. 23, by not using the beacon period 302 and starting the communication in the beacon period 303, the terminal device 102 can transmit the data frame 333 which could not be transmitted in the beacon period 301, without reducing the transmission efficiency of the whole wireless network 100.

According to the present embodiment, if the data volume is small, the power consumption can be reduced, and if the data volume is large, a transmission speed can be improved; thus, depending on the data volume that has to be transmitted, both advantageous effects of reduction of the power consumption and improvement of the transmission speed can be obtained.

The configuration of the control device 101 other than the antenna 201, and the configuration of the terminal devices 102 to 104 other than the antenna 221 can be achieved as an LSI (Large Scale Integration) which is an integrated circuit. These configurations may be realized in a single chip, or may be realized partly, including one part of the configuration, in a single chip. Although the LSI referred to in the above description is, depending on the difference in the degree of integration, also called as an IC (Integrated Circuit), a system LSI, a super LSI or an ultra LSI; the LSI referred to in the above description include all of these. Furthermore, the method of circuit integration is not limited to the LSI, and the circuit integration may be realized by a dedicated circuit or a general-purpose processor. Still further, an FPGA (Field Programmable Gate Array) that is capable of programming after manufacturing the LSI or a reconfigurable processor that is capable of reconfiguring connections and configurations of a circuit cell within the LSI, may be used. Additionally, the calculation of these functional blocks may be calculated, for example, by using a DSP (Digital Signal Processor), a CPU (Central Processing Unit), or the like. In addition, these processing steps may be stored as a program in a storage medium and may be processed by executing the program.

Furthermore, if a technology for the circuit integration that replaces the LSI is introduced with an advance in semiconductor technology or a derivation from other technologies, obviously, such technologies may be used for the integration of the functional block. There may be a possibility of application of biotechnology or the like.

Furthermore, the present invention is also directed toward a method and a program, which achieve functions of the control device and the terminal device described above. In addition, it is also directed toward a wireless network system that includes the control device and the terminal device described above.

INDUSTRIAL APPLICABILITY

A communication system, and a communication device and a communication method, which are used in the communication system, according to the present invention, are useful as, ones which are superior in power-saving performance and in transmission delay of data transmission and reception, and which conduct a highly efficient communication, and the like.

REFERENCE SIGNS LIST 100, 400 wireless network
101, 401 control device 102, 103, 104, 402, 403, 404 terminal device
201 antenna
202 wireless reception section
203 reception data analyzing section
204 timing controlling section
205 beacon generating section
206 channel configuration section
207 wireless transmission section
208 transmission data generating section
209 interface
210 data volume determining section
221 antenna
222 wireless reception section
223 reception data analyzing section
224 control section
225 channel configuration section
226 wireless transmission section
227 transmission data generating section
228 interface
229 data volume determining section
500 wireless frame
501 PHY header
502 MAC Header
503 payload
504 error correcting code
511 frame control code
512 transmission destination address
513 transmission source address
520 beacon frame payload
521 superframe cycle
522 beacon period
523 the beacon period number
524 channel-usage sequence
525 continuous transmission terminal identifier

The invention claimed is:

1. A terminal device, which is used in a communication system that conducts a communication by periodically switching a plurality of frequency channels in a predefined sequence, and which communicates with a control device that uses a predefined frequency channel of the plurality of frequency channels, the terminal device comprising:
    an antenna that conducts transmission and reception of a wireless signal;
    a reception section that receives, from the control device, via the antenna, a beacon that contains control information indicating at least a switching sequence and a switching timing of a frequency channel of the plurality of frequency channels;
    a transmission section that transmits transmission data to the control device via the antenna;
    a data volume determining section that determines whether or not it is possible to complete a transmission of the transmission data within an assigned period assigned to the terminal device to use the predefined frequency channel to conduct a communication with the control device; and
    a control section that controls, during the assigned period, a reception of the beacon by the reception section and a transmission of the transmission data by the transmission section,
    wherein, when the data volume determining section determines that it is not possible to complete the transmission of the transmission data within the assigned period, the control section (i) ascertains a frequency channel, of the plurality of frequency channels, that is to be used by another terminal device for a communication with the control device after the assigned period, based on the control information, (ii) switches to the ascertained frequency channel after the assigned period has elapsed, and (iii) controls the transmission section to continue the transmission of the transmission data using the ascertained frequency channel.

2. The terminal device according to claim 1,
    wherein the reception section further receives reception data from the control device, and
    wherein, when the control information included in the beacon further includes an identifier of the terminal device for indicating that the transmission of the reception data from the control device to the terminal device will not be completed within the assigned period, the control section (i) ascertains the frequency channel that is to be used during the period while the other terminal device conducts the communication with the control device after the assigned period, based on the control information, (ii) switches to the ascertained frequency channel after the assigned period has elapsed, and (iii) controls the reception section to continue the reception of the reception data using the ascertained frequency channel.

3. The terminal device according to claim 2, wherein the control section determines, when the switching to the ascertained frequency channel that is to be used during the period while the other terminal device conducts the communication with the control device after the assigned period is not conducted, based on the control information, the switching timing in which the predefined frequency channel assigned to the terminal device is used again, and causes the terminal device to wait in a power-saving mode until the determined switching timing.

4. The terminal device according to claim 1, wherein the control section determines, when the switching to the ascertained frequency channel that is to be used during the period while the other terminal device conducts the communication with the control device after the assigned period is not conducted, based on the control information, the switching timing in which the predefined frequency channel assigned to the terminal device is used again, and causes the terminal device to wait in a power-saving mode until the determined switching timing.

5. The terminal device according to claim 1, wherein the data volume determining section determines that it is not possible to complete the transmission of the transmission data within the assigned period, when a data volume of the transmission data to be transmitted to the control device exceeds a data volume that allows for the transmission within the assigned period.

6. A control device, which is used in a communication system that conducts a communication using a plurality of frequency channels and periodically switches the plurality of frequency channels in a predefined sequence, and which conducts a communication with one or more terminal devices respectively assigned with a predefined frequency channel of the plurality of frequency channels, the control device comprising:
    an antenna that conducts transmission and reception of a wireless signal;
    a beacon generating section that generates a beacon containing control information indicating at least a switching sequence and a switching timing of a frequency channel of the plurality of frequency channels;
    a transmission section that transmits the beacon and transmission data to the one or more terminal devices via the antenna;

a data volume determining section that determines whether or not it is possible to complete a transmission of the transmission data to a destination terminal device, of the one or more terminal devices, that is a transmission destination of the transmission data within a period while a frequency channel, of the plurality of frequency channels, assigned to the destination terminal device is in use; and a control section which (i) periodically switches to a frequency channel, of the plurality of frequency channels, in the predefined sequence, (ii) controls the beacon generating section to generate the beacon, and (iii) controls the transmission section to perform, during a period while the frequency channel obtained as a result of the switching is in use, the transmission of the beacon and the transmission of the transmission data to a terminal device, of the one or more terminal devices, assigned with the frequency channel obtained as the result of the switching, wherein, when the data volume determining section determines that it is not possible to complete the transmission of the transmission data to the destination terminal device, the control section (i) controls the transmission section to transmit the beacon or a data frame containing an identifier of the destination terminal device to the destination terminal device, and continue the transmission of the transmission data to the destination terminal device that recognizes the identifier and (ii) switches to a switched to frequency channel, of the plurality of frequency channels, used for a communication with a terminal device other than the destination terminal device, by using the switched to frequency channel after the period while the frequency channel obtained as the result of the switching is in use.

7. The control device according to claim 6, wherein the data volume determining section determines that it is not possible to complete the transmission of the transmission data within the assigned period, when a data volume of the transmission data to be transmitted to the destination terminal device exceeds a data volume that allows for the transmission within the period while the frequency channel assigned to the destination terminal device is in use.

8. A communication system that conducts a communication between a control device and one or more terminal devices by periodically switching a plurality of frequency channels in a predefined sequence, wherein each respective terminal of the one or more terminal devices includes:

a first antenna that conducts transmission and reception of a wireless signal;

a first reception section that receives, from the control device, via the first antenna, reception data and a beacon that contains control information indicating at least a switching sequence and a switching timing of a frequency channel of the plurality of frequency channels;

a first transmission section that transmits transmission data to the control device via the first antenna;

a first data volume determining section that determines whether or not it is possible to complete a transmission of the transmission data within an assigned period assigned to the respective terminal device to use the predefined frequency channel to conduct a communication with the control device; and a first control section that controls, during the assigned period, a reception of the beacon and the reception data by the first reception section and a transmission of the transmission data by the first transmission section, wherein, when the first data volume determining section determines that it is not possible to complete the transmission of the transmission data within the assigned period, the first control section (i) ascertains a frequency channel, of the plurality of frequency channels, that is to be used by another terminal device, of the one or more terminal devices, for a communication with the control device after the assigned period, based on the control information, (ii) switches to the ascertained frequency channel after the assigned period has elapsed, and (iii) controls the first transmission section to continue the transmission of the transmission data using the ascertained frequency channel, and wherein, when the control information included in the beacon further includes an identifier of the respective terminal device for indicating that the transmission of the reception data from the control device to the respective terminal device will not be completed within the assigned period, the first control section (i) ascertains the frequency channel that is to be used during the period while the other terminal device conducts the communication with the control device after the assigned period, based on the control information, (ii) switches to the ascertained frequency channel after the assigned period has elapsed, and (iii) controls the first reception section to continue the reception of the reception data using the ascertained frequency channel, and wherein the control device includes:

a second antenna that conducts transmission and reception of a wireless signal;

a second reception section that receives reception data from the one or more terminal devices via the second antenna;

a beacon generating section that generates a beacon containing control information indicating at least a switching sequence and a switching timing of a frequency channel of the plurality of frequency channels;

a second transmission section that transmits the beacon and the transmission data to the one or more terminal devices via the second antenna;

a second data volume determining section that determines whether or not it is possible to complete a transmission of the transmission data to a destination terminal device, of the one or more terminal devices, that is a transmission destination of the transmission data within a period while a frequency channel, of the plurality of frequency channels, assigned to the destination terminal device is in use; and a second control section which (i) periodically switches to a frequency channel, of the plurality of frequency channels, in the predefined sequence, (ii) controls the beacon generating section to generate the beacon, and (iii) controls the second transmission section to perform, during a period while the frequency channel obtained as a result of the switching is in use, the transmission of the beacon and the transmission of the transmission data to a terminal device, of the one or more terminal devices, assigned with the frequency channel obtained as the result of the switching, wherein, when the second data volume determining section determines that it is not possible to complete the transmission of the transmission data to the destination terminal device, the second control section, (i) controls the second transmission section to transmit the beacon or a data frame containing an identifier of the destination terminal device to the destination terminal device, and continue the transmission of the transmission data to the destination terminal device that recognizes the identifier and (ii) switches to a switched to frequency channel, of the plurality of frequency channels, used for a communication with a terminal device other than the destination terminal device, by using the switched to frequency channel after the period while the frequency channel obtained as the result of the switching is in use.

9. An integrated circuit, which is used in a communication system that conducts a communication by periodically switching a plurality of frequency channels in a predefined sequence, and which includes a communication function that conducts a communication with a control device that uses a predefined frequency channel of the plurality of frequency channels, the integrated circuit comprising circuits which act as:
- a reception section that receives, from the control device, via an antenna, a beacon that contains control information indicating at least a switching sequence and a switching timing of a frequency channel of the plurality of frequency channels;
- a transmission section that transmits transmission data to the control device via the antenna;
- a data volume determining section that determines whether or not it is possible to complete a transmission of the transmission data within an assigned period assigned to use the predefined frequency channel to conduct a communication with the control device; and
- a control section that controls, during the assigned period, a reception of the beacon by the reception section and a transmission of the transmission data by the transmission section,
    - wherein, when the data volume determining section determines that it is not possible to complete the transmission of the transmission data within the assigned period, the control section (i) ascertains a frequency channel, of the plurality of frequency channels, that is to be used by an element other than the integrated circuit for a communication with the control device after the assigned period, based on the control information, (ii) switches to the ascertained frequency channel after the assigned period has elapsed, and (iii) controls the transmission section to continue the transmission of the transmission data using the ascertained frequency channel.

10. An integrated circuit, which is used in a communication system that conducts a communication using a plurality of frequency channels and periodically switches the plurality of frequency channels in a predefined sequence, and which includes a communication function that conducts a communication with one or more terminal devices respectively assigned with a predefined frequency channel of the plurality of frequency channels, the integrated circuit comprising circuits which act as:
- a reception section that receives reception data from the one or more terminal devices via an antenna;
- a beacon generating section that generates a beacon containing control information indicating at least a switching sequence and a switching timing of a frequency channel of the plurality of frequency channels;
- a transmission section that transmits the beacon and transmission data to the one or more terminal devices via the antenna;
- a data volume determining section that determines whether or not it is possible to complete a transmission of the transmission data to a destination terminal device, of the one or more terminal devices, that is a transmission destination of the transmission data within a period while a frequency channel, of the plurality of frequency channels, assigned to the destination terminal device is in use; and
- a control section which (i) periodically switches to a frequency channel, of the plurality of frequency channels, in the predefined sequence, (ii) controls the beacon generating section to generate the beacon, and (iii) controls the transmission section to perform, during a period while the frequency channel obtained as a result of the switching is in use, the transmission of the beacon and the transmission of the transmission data to a terminal device, of the one or more terminal devices, assigned with the frequency channel obtained as the result of the switching,
    - wherein, when the data volume determining section determines that it is not possible to complete the transmission of the transmission data to the destination terminal device, the control section, (i) controls the transmission section to transmit the beacon or a data frame containing an identifier of the destination terminal device to the destination terminal device, and continue the transmission of the transmission data to the destination terminal device that recognizes the identifier and (ii) switches to a switched to frequency channel, of the plurality of frequency channels, used for a communication with a terminal device other than the destination terminal device, by using the switched to frequency channel after the period while the frequency channel obtained as the result of the switching is in use.

11. A communication method, which is used in a communication system that conducts a communication by periodically switching a plurality of frequency channels in a predefined sequence, and which conducts a communication with a control device that uses a predefined frequency channel of the plurality of frequency channels, the communication method comprising:
- a step of receiving, from the control device, via an antenna, a beacon that contains control information indicating at least a switching sequence and a switching timing of a frequency channel of the plurality of frequency channels;
- a step of transmitting transmission data to the control device via the antenna;
- a step of determining whether or not it is possible to complete a transmission of the transmission data within an assigned period assigned to a destination terminal device to use the predefined frequency channel to conduct a communication with the control device, the destination terminal device being a transmission destination of the transmission data; and
- a step of controlling, during the assigned period, an execution of the step of receiving to receive the beacon, and an execution of the step of transmitting to transmit the transmission data,
    - wherein, when the step of determining determines that it is not possible to complete the transmission of the transmission data within the assigned period, the step of controlling (i) ascertains a frequency channel, of the plurality of frequency channels, that is to be used by a terminal device other than the destination terminal device for a communication with the control device after the assigned period, based on the control information, (ii) switches to the ascertained frequency channel after the assigned period has elapsed, and (iii) executes the step of transmitting to continue the transmission of the transmission data using the ascertained frequency channel.

12. A communication method, which is used in a communication system that conducts a communication using a plurality of frequency channels and periodically switches the plurality of frequency channels in a predefined sequence, and which conducts a communication with one or more terminal devices respectively assigned with a predefined frequency channel of the plurality of frequency channels, the communication method comprising:

a step of receiving reception data from the terminal devices via an antenna;
a step of generating a beacon containing control information indicating at least a switching sequence and a switching timing of a frequency channel of the plurality of frequency channels;
a step of transmitting the beacon and transmission data to the one or more terminal devices via the antenna;
a step of determining whether or not it is possible to complete a transmission of the transmission data to a destination terminal device, of the one or more terminal devices, that is a transmission destination of the transmission data within a period while a frequency channel, of the plurality of frequency channels, assigned to the destination terminal device is in use; and
a step of performing a control to (i) periodically switch to a frequency channel, of the plurality of frequency channels, in the predefined sequence, (ii) execute the step of generating to generate the beacon, and (iii) execute the step of transmitting to perform, during a period while the frequency channel obtained as a result of the switching is in use, the transmission of the beacon and the transmission of the transmission data to a terminal device, of the one or more terminal devices, assigned with the frequency channel obtained as the result of the switching, wherein
the step of performing the control further includes, when the step of determining determines that it is not possible to complete the transmission of the transmission data to the destination terminal device (i) executing the step of transmitting to transmit the beacon or a data frame containing an identifier of the destination terminal device to the destination terminal device, and continue the transmission of the transmission data to the destination terminal device that recognizes the identifier and (ii) switching to a switched to frequency channel, of the plurality of frequency channels, used for a communication with a terminal device other than the destination terminal device, by using the switched to frequency channel after the period while the frequency channel obtained as the result of the switching is in use.

13. A non-transitory computer-readable recording medium having a computer program recorded thereon, the computer program being used by a terminal device which is used in a communication system that conducts a communication by periodically switching a plurality of frequency channels in a predefined sequence and which communicates with a control device that uses a predefined frequency channel of the plurality of frequency channels, the communication program causing a computer to execute a method comprising:

a step of receiving, from the control device, via an antenna, a beacon that contains control information indicating at least a switching sequence and a switching timing of a frequency channel of the plurality of frequency channels;
a step of transmitting transmission data to the control device via the antenna;
a step of determining whether or not it is possible to complete a transmission of the transmission data within an assigned period assigned to the terminal device to use the predefined frequency channel to conduct a communication with the control device; and
a step of controlling, during the assigned period, an execution of the step of receiving to receive the beacon, and an execution of the step of transmitting to transmit the transmission data,
wherein, when the step of determining determines that it is not possible to complete the transmission of the transmission data within the assigned period, the step of controlling (i) ascertains a frequency channel, of the plurality of frequency channels, that is to be used by another terminal device for a communication with the control device after the assigned period, based on the control information, (ii) switches to the ascertained frequency channel after the assigned period has elapsed, and (iii) executes the step of transmitting to continue the transmission of the transmission data using the ascertained frequency channel.

14. A non-transitory computer-readable recording medium having a computer program recorded thereon, the computer program being used by a control device which is used in a communication system that conducts a communication using a plurality of frequency channels and periodically switches the plurality of frequency channels in a predefined sequence, and which conducts a communication with one or more terminal devices respectively assigned with a predefined frequency channel, of the plurality of frequency channels, the computer program causing a computer to execute a method comprising:

a step of receiving reception data from the terminal devices via an antenna;
a step of generating a beacon containing control information indicating at least a switching sequence and a switching timing of a frequency channel of the plurality of frequency channels;
a step of transmitting the beacon and transmission data to the one or more terminal devices via the antenna;
a step of determining whether or not it is possible to complete a transmission of the transmission data to a destination terminal device, of the one or more terminal devices, that is a transmission destination of the transmission data within a period while a frequency channel, of the plurality of frequency channels, assigned to the destination terminal device is in use; and
a step of performing a control to (i) periodically switch to a frequency channel, of the plurality of frequency channels, in the predefined sequence, (ii) execute the step of generating to generate the beacon, and (iii) execute the step of transmitting to perform, during a period while the frequency channel obtained as a result of the switching is in use, the transmission of the beacon and the transmission of the transmission data to a terminal device, of the one or more terminal devices, assigned with the frequency channel obtained as the result of the switching, wherein
the step of performing the control further includes, when the step of determining determines that it is not possible to complete the transmission of the transmission data to the destination terminal device (i) executing the step of transmitting to transmit the beacon or a data frame containing an identifier of the destination terminal device to the destination terminal device, and continue the transmission of the transmission data to the destination terminal device that recognizes the identifier and (ii) switching to a switched to frequency channel, of the plurality of frequency channels, used for a communication with a terminal device other than the destination terminal device, by using the switched to frequency channel after the period while the frequency channel obtained as the result of the switching is in use.

* * * * *